United States Patent
Miwa

(10) Patent No.: US 10,721,856 B2
(45) Date of Patent: Jul. 28, 2020

(54) WORK VEHICLE

(71) Applicant: YANMAR CO., LTD., Osaka-shi, Osaka (JP)

(72) Inventor: Toshiyuki Miwa, Osaka (JP)

(73) Assignee: YANMAR CO., LTD., Osaka (JP)

(*) Notice: Subject to any disclaimer, the term of this patent is extended or adjusted under 35 U.S.C. 154(b) by 45 days.

(21) Appl. No.: 15/518,980

(22) PCT Filed: Oct. 13, 2015

(86) PCT No.: PCT/JP2015/078889
§ 371 (c)(1),
(2) Date: Apr. 13, 2017

(87) PCT Pub. No.: WO2016/060108
PCT Pub. Date: Apr. 21, 2016

(65) Prior Publication Data
US 2017/0231148 A1 Aug. 17, 2017

(30) Foreign Application Priority Data

Oct. 16, 2014 (JP) .................. 2014-212134
May 26, 2015 (JP) .................. 2015-106873

(51) Int. Cl.
*A01B 63/02* (2006.01)
*A01B 69/06* (2006.01)
(Continued)

(52) U.S. Cl.
CPC ............. *A01B 63/02* (2013.01); *A01B 59/06* (2013.01); *B05B 13/005* (2013.01); *B60K 35/00* (2013.01);
(Continued)

(58) Field of Classification Search
CPC ....... B05B 13/005; A01C 15/60; A01B 63/02; A01B 59/06; A01B 59/061; A01B 59/062;
(Continued)

(56) References Cited

U.S. PATENT DOCUMENTS 5,904,296 A * 5/1999 Doherty ................. A01C 17/00
239/61
6,061,617 A * 5/2000 Berger ................... A01B 63/10
700/18
(Continued)

FOREIGN PATENT DOCUMENTS

CN 101424921 A 5/2009
CN 103492646 A 1/2014
(Continued)

OTHER PUBLICATIONS

International Search Report corresponding to Application No. PCT/JP2015/078889; dated Dec. 28, 2015.
(Continued)

Primary Examiner — Joseph A Greenlund
(74) Attorney, Agent, or Firm — Norton Rose Fulbright US LLP

(57) ABSTRACT

The objective of the present invention is to provide a work vehicle where an operator can, on the work vehicle side, confirm which working machine is engaged and set which working machine to engage. A tractor, to which a working machine can be mounted, is provided with: a liquid crystal panel selectably displaying an engageable working machine mounted and displaying the currently engaged working machine so as to be identifiable; an operation unit (encoder dial, enter button, and command buttons) for carrying out selection and determination operations for the working machine displayed on the liquid crystal panel; and a control device that, when a determination operation is carried out by
(Continued)

the operation unit for a desired working machine, disengages the currently engaged working machine, and configures the working machine for which the determination operation has been carried out to be engaged.

17 Claims, 26 Drawing Sheets

(51) Int. Cl.
  *B60K 37/06*   (2006.01)
  *B60K 35/00*   (2006.01)
  *B05B 13/00*   (2006.01)
  *A01C 15/00*   (2006.01)
  *A01B 63/102*   (2006.01)
  *A01B 59/06*   (2006.01)

(52) U.S. Cl.
  CPC ............. *B60K 37/06* (2013.01); *A01C 15/00* (2013.01); *B60K 2370/152* (2019.05); *B60K 2370/61* (2019.05)

(58) Field of Classification Search
  CPC ..... E02F 9/26; E02F 9/264; E02F 3/96; E02F 9/2058
  USPC .......................................................... 701/51
  See application file for complete search history.

(56) References Cited

U.S. PATENT DOCUMENTS

| | | | |
|---|---|---|---|
| 6,522,964 B1* | 2/2003 | Miki | E02F 9/205 172/315 |
| 6,776,355 B2* | 8/2004 | Ringer | A01M 7/0089 239/159 |
| 6,880,331 B1* | 4/2005 | Hulse | F15B 19/002 60/368 |
| 6,938,829 B2* | 9/2005 | Doherty | A01C 17/00 239/1 |
| 7,099,722 B2* | 8/2006 | Casey | E02F 3/96 700/188 |
| 7,168,636 B2* | 1/2007 | Lebeda | A01D 43/14 239/11 |
| 7,738,979 B2* | 6/2010 | Schmuck | E02F 3/96 700/188 |
| 8,041,485 B2* | 10/2011 | Prasetiawan | E02F 9/166 180/330 |
| 8,392,075 B2* | 3/2013 | Mindeman | E02F 9/26 701/50 |
| 8,621,855 B2* | 1/2014 | Meyeres | E02F 9/2203 60/327 |
| 8,862,274 B2* | 10/2014 | Reiter | A01B 63/00 700/17 |
| 9,063,530 B2* | 6/2015 | Lougheed | G05B 19/04 |
| 9,080,319 B2* | 7/2015 | Oates, Jr. | E02F 3/96 |
| 9,559,506 B2* | 1/2017 | Korcz | H02G 3/083 |
| 2005/0283295 A1* | 12/2005 | Normann | E02F 9/26 701/50 |
| 2010/0185335 A1* | 7/2010 | Sawada | E02F 3/3618 700/282 |
| 2011/0139895 A1* | 6/2011 | Kuphal | A01M 7/0053 239/166 |
| 2011/0204712 A1* | 8/2011 | Tarasinski | A01B 59/06 307/9.1 |
| 2014/0058635 A1* | 2/2014 | Furukawa | B60R 16/02 701/50 |
| 2014/0190046 A1* | 7/2014 | Shibata | E02F 3/964 37/403 |
| 2014/0374515 A1* | 12/2014 | Truan | A01C 17/003 239/669 |
| 2016/0338335 A1* | 11/2016 | Hammer | B05B 1/20 |

FOREIGN PATENT DOCUMENTS

| | | |
|---|---|---|
| EP | 0989242 A1 | 3/2000 |
| EP | 2138639 A1 | 12/2009 |
| JP | S62167503 U1 | 10/1987 |
| JP | 09-037622 A | 2/1997 |
| JP | H09165797 A | 6/1997 |
| JP | 3227672 B | 11/2001 |
| JP | 2004329067 A | 11/2004 |
| JP | 2005-218386 A | 8/2005 |
| JP | 4171431 B2 | 10/2008 |
| JP | 2008266975 A | 11/2008 |
| JP | 2012-188862 A | 10/2012 |
| JP | 2012-196158 A | 10/2012 |

OTHER PUBLICATIONS

Extended European Search Report for corresponding EP Patent Application No. 15851047.9-1656/3207781 PCT/JP2015/078889; dated Sep. 22, 2017.
Japanese Office Action dated Feb. 5, 2019 issued in corresponding JP Application 2015-106873 cites the patent document above.
Chinese Office Action dated Sep. 30, 2018 issued in corresponding CN Application 201580056381 cites the patent document above.
Office Action dated Aug. 6, 2019, JP Application No. 2015-106873, citing the references herein.

* cited by examiner

WORK VEHICLE

CROSS REFERENCE TO RELATED APPLICATIONS

This is the U.S. national stage of application No. PCT/JP2015/078889, filed on Oct. 13, 2015. Priority under 35 U.S.C. § 119(a) and 35 U.S.C. § 365(b) is claimed from Japanese Application No. 2014-212134, filed on Oct. 16, 2014, and Japanese Application No. 2015-106873, filed on May 26, 2015, the disclosures of which are also incorporated herein by reference.

TECHNICAL FIELD

The present invention relates to a work vehicle.

BACKGROUND ART

Conventionally known work vehicles include a tractor for farm work and a wheel loader for construction work. Some of such work vehicles use a working machine attached thereto, corresponding to the work to be performed. Some working machines can be interlocked with the work vehicles. For example, the tractor can be interlocked with a loader, a sprayer, a broadcaster, and the like (refer to Patent Literature 1).

Generally, a working machine is provided with an interlock switch with which interlocking with the tractor is turned ON and OFF, and a display lamp indicating the interlocking with the tractor. Thus, the interlocking state with respect to the tractor is operated and displayed.

CITATION LIST

Patent Literature

PTL 1: Japanese Unexamined Patent Application Publication No. 2004-329067

SUMMARY OF INVENTION

Technical Problem

The tractor has no unit for operating and displaying the interlocking state with respect to the working machine. Thus, the operator on the tractor needs to get off the tractor and move to the working machine to check and operate the interlocking state. In particular, when working machines, such as a loader and a broadcaster, are attached to front and rear sides of the working machine at the same time, the operator needs to go through a cumbersome procedure of moving to and checking both working machines.

An object of the present invention is to provide a work vehicle that enables an operator to check a currently interlocked working machine and set a working machine to be interlocked on the work vehicle side.

Solution to Problem

The present invention provides a work vehicle to which a working machine is attachable, the work vehicle including: a display unit configured to display, in a selectable manner, a working machine that is attached and is able to be interlocked, and to display, in an identifiable manner, a currently interlocked working machine; an operation unit with which an operation of selecting and determining a working machine displayed, on the display unit, is performed; and a control unit configured to perform control, when an operation of determining a desired working machine is performed with the operation unit, interlocking of the currently interlocked working machine is released and the desired working machine determined by the operation is interlocked.

In the above-described work vehicle, the display unit may be configured to display a working machine that is not attached and is able to be interlocked, in an identifiable and non-selectable manner.

In the above-described work vehicle, the control unit may be configured to perform control in such a manner that the working machine that is attached and is able to be interlocked is detected at a predetermined interval.

In the above-described work vehicle, the operation unit may include a plurality of buttons and an encoder dial integrally provided to the display unit.

The above-described work vehicle may further include a transmission lever connected to the control unit; and a switch provided to the transmission lever. When a sprayer is interlocked as the working machine, the switch may be assigned with any one of a spraying start/end function for the sprayer, a spraying amount adjustment function for the sprayer, an extending/contracting adjustment function for a boom of the sprayer, an inclination adjustment function for the boom, an opening/closing adjustment function for the boom, and a lifting/lowering adjustment function for the boom.

The above-described work vehicle may further include a transmission lever connected to the control unit; and a switch provided to the transmission lever. When a broadcaster is interlocked as the working machine, the switch may be assigned with a spraying start/end function for the broadcaster or a spraying amount adjustment function for the broadcaster.

Advantageous Effects of Invention

With the work vehicle according to the present invention, a unit for operating and displaying an interlocking state with the working machine is provided on a work vehicle side. Thus, the operator can set and check the interlocking state of the working machine on the side of the work vehicle. Thus, the operator on the work vehicle can check the currently interlocked working machine and set the working machine to be interlocked, while being on the work vehicle, that is, without getting off the work vehicle and moving to the working machine, and thus can enjoy a higher work efficiency.

A unit for operating and displaying the interlocking state with respect to the work vehicle can be omitted from the working machine, and thus a cost reduction can be achieved. When the unit for operating and displaying the interlocking state with respect to the work vehicle is provided to the working machine, the operator can set and check the interlocking state on the work vehicle and on the working machine and thus can enjoy a higher operability.

With the work vehicle according to the present invention, a working machine that can be interlocked but is not attached may be displayed in the identifiable manner. Thus, the operator can enjoy higher convenience with the working machine that can be interlocked but is not attached being immediately identifiable. The working machine that can be interlocked but is not attached cannot be selected, and thus is prevented from being accidentally selected by the operator.

With the work vehicle according to the present invention, the working machine that is attached and can be interlocked is detected at a predetermined interval. Thus, a latest state indicating a working machine that can be interlocked can be displayed.

With the work vehicle according to the present invention, the plurality of buttons and the encoder dial integrally formed with the display unit may be used as the operation unit. Thus, an operation can be intuitively and quickly performed.

With the work vehicle according to the present invention, the switch provided to the transmission lever may be assigned with the desired function for operating the interlocked working machine. Thus, the operator can easily operate the assigned functions at hand without releasing his or her hand from the transmission lever and thus can enjoy a less cumbersome operation. All things considered, higher operability and work efficiency can be achieved, and a load on the operator can be reduced.

DESCRIPTION OF EMBODIMENTS

The technical concept of the present invention is applicable to any work vehicle. The following gives a description using a tractor, which is a typical work vehicle, as an example.

First, a tractor 1 is briefly described.

Figure 1:
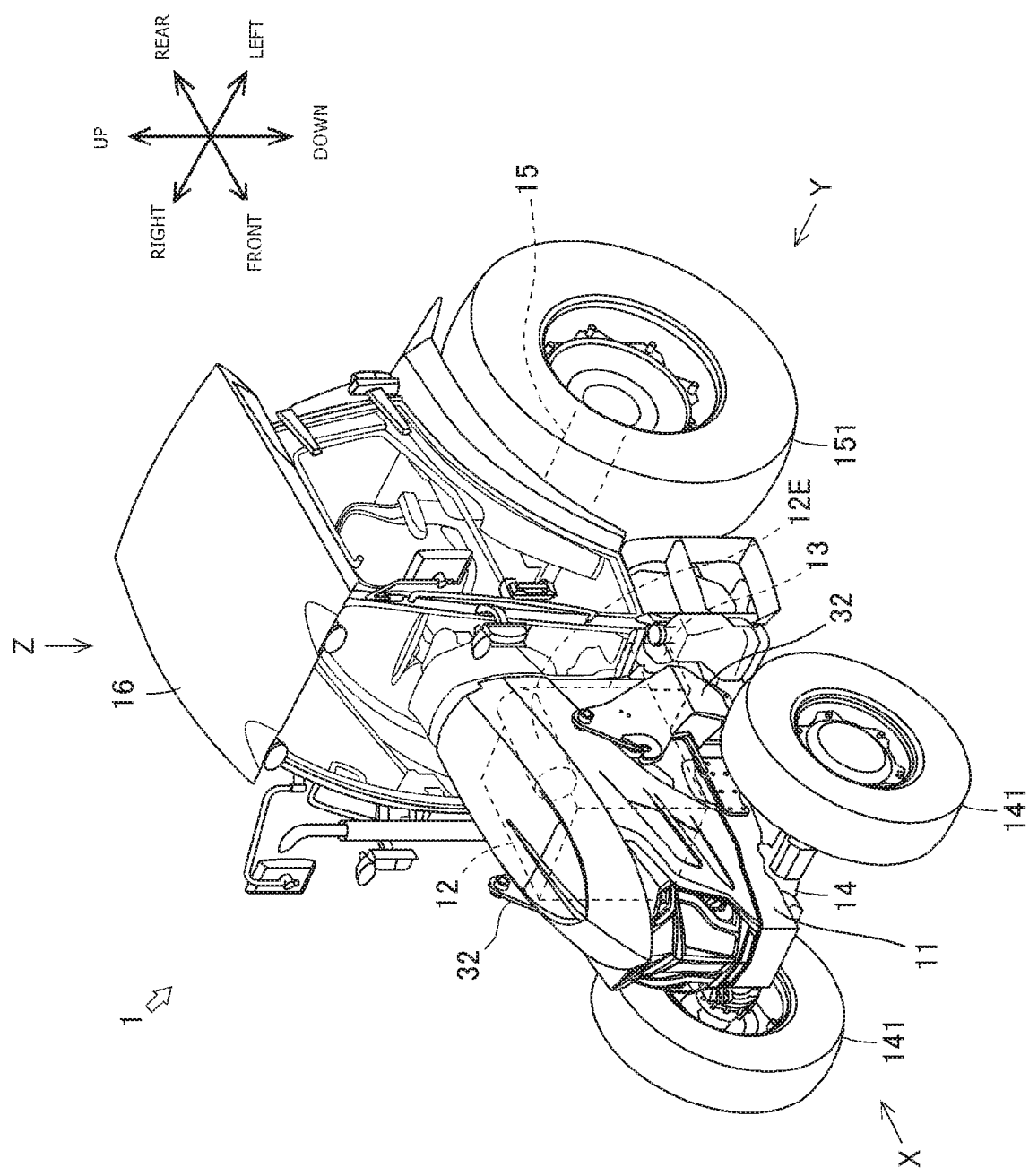
FIG. 1 is an external perspective view of a tractor.
Figure 2:
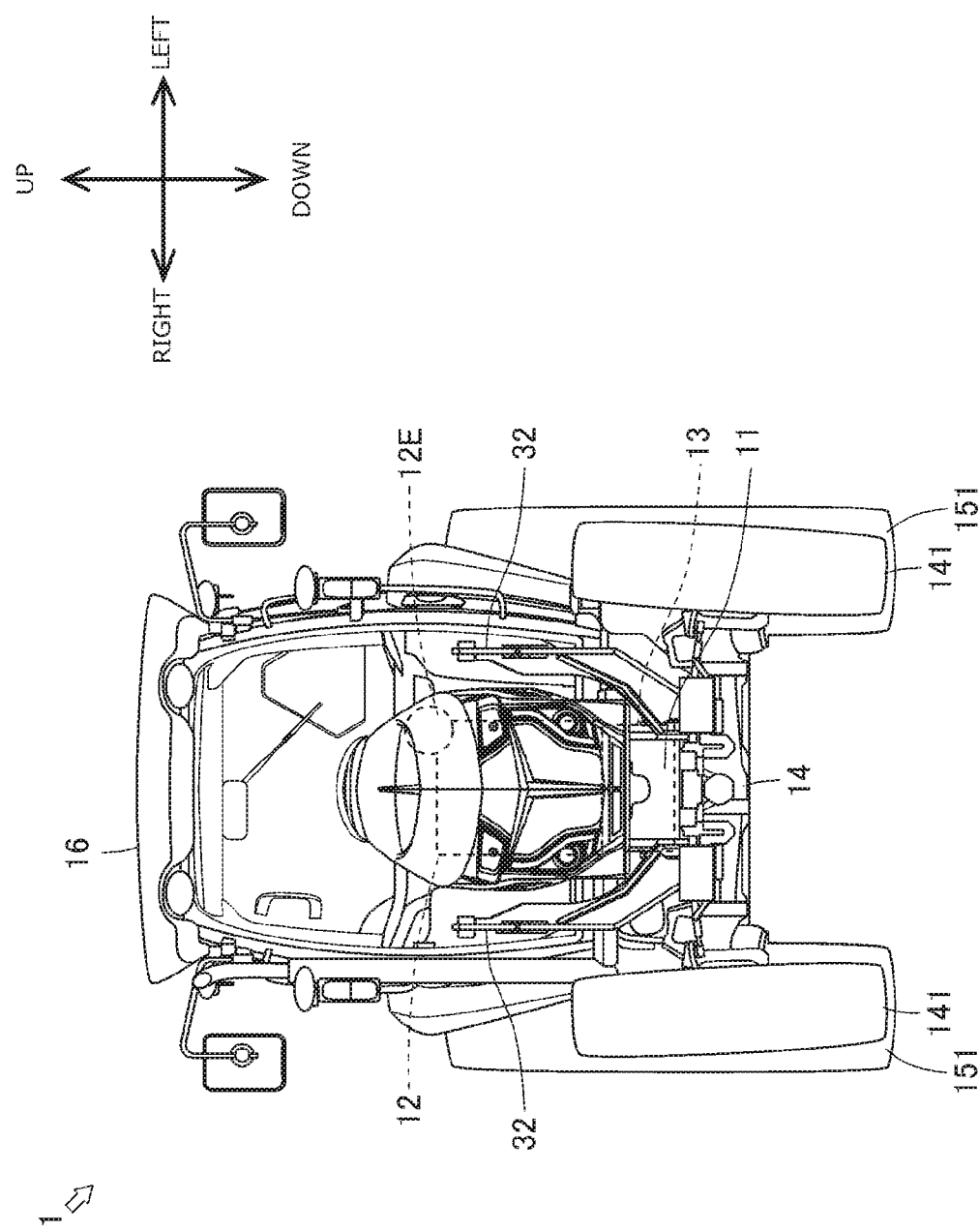
FIG. 2 is a diagram viewed in the direction of an arrow X in FIG. 1.
Figure 3:
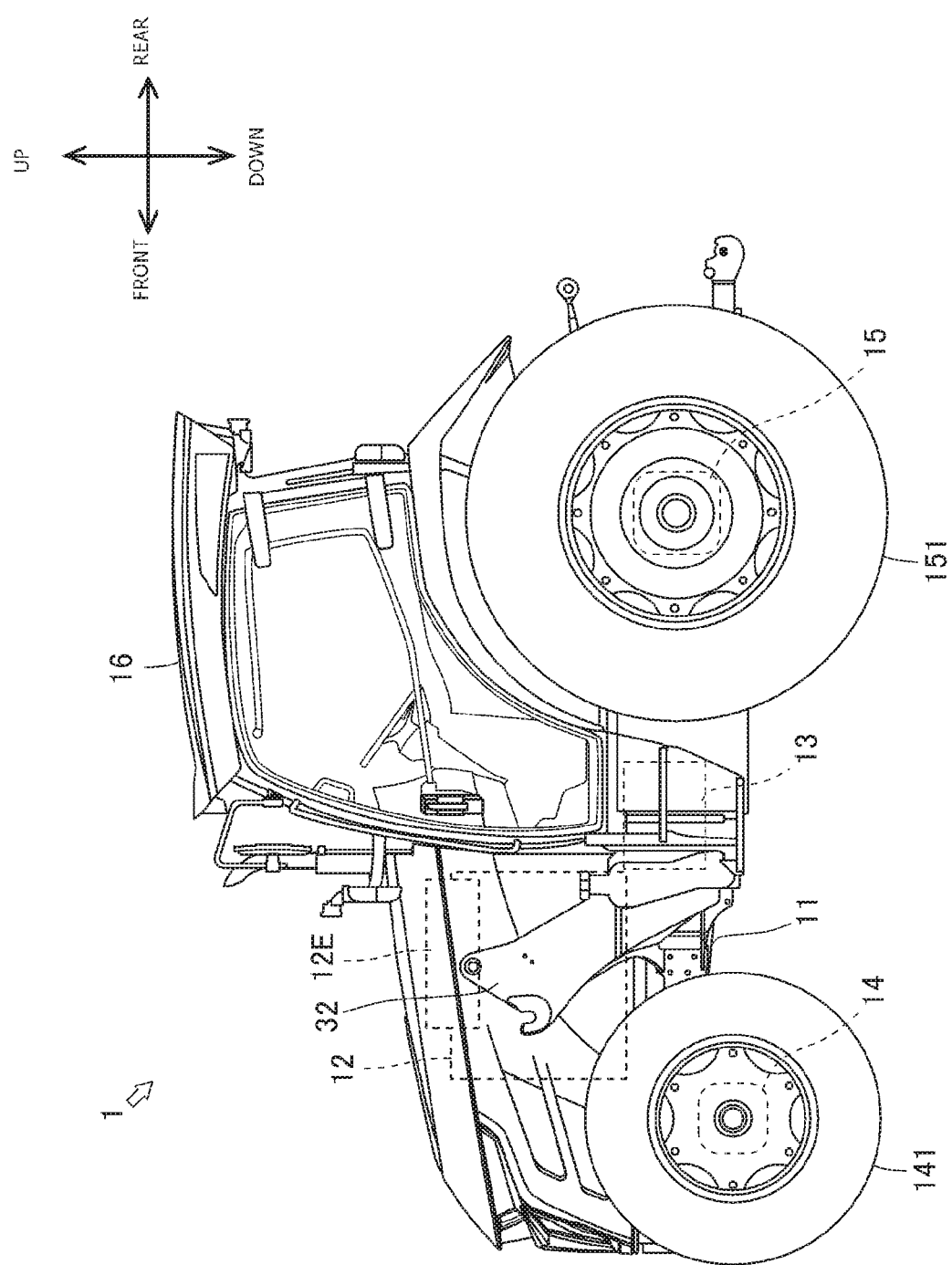
FIG. 3 is a diagram viewed in the direction of an arrow Y in FIG. 1.
Figure 4:
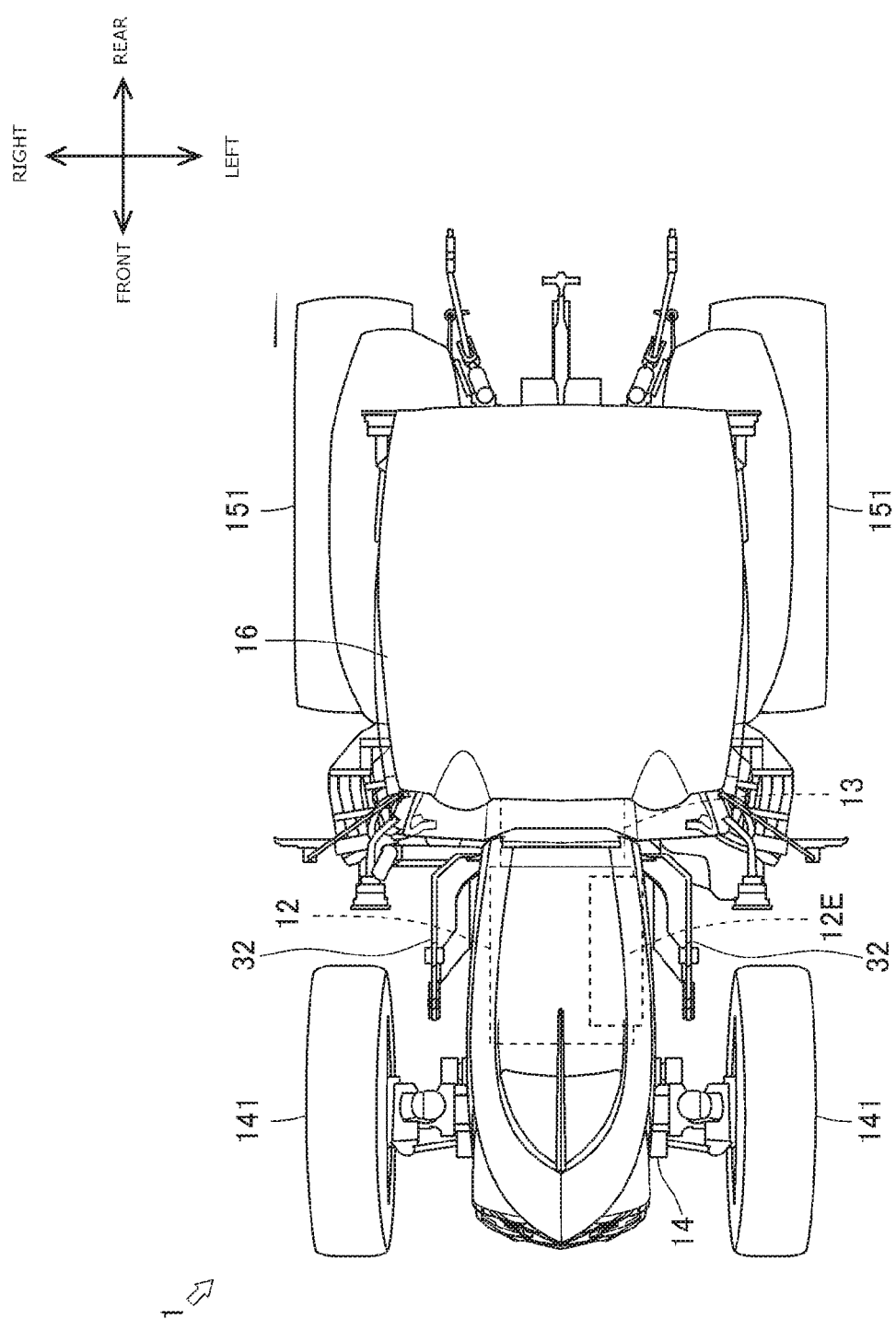
FIG. 4 is a diagram viewed in the direction of an arrow Z in FIG. 1.

FIG. 1 illustrates the tractor 1. FIG. 2 is a diagram viewed in the direction of an arrow X in FIG. 1, FIG. 3 is a diagram viewed in the direction of an arrow Y in FIG. 1, and FIG. 4 is a diagram viewed in the direction of an arrow Z in FIG. 1. In these figures, the front and rear direction, the right and left direction, and the upper and lower direction of the tractor 1 are illustrated.

The tractor 1 mainly includes a frame 11, an engine 12, a transmission 13, a front axle 14, and a rear axle 15. The tractor 1 further includes a cabin 16. The cabin 16 has an inner side serving as an operation control room in which an operator's seat 161, an accelerator pedal 162, a shift lever 163, and the like are arranged (see FIG. 7).

The frame 11 serves as a front frame of the tractor 1. The frame 11, the transmission 13, and the rear axle 15 form a chassis of the tractor 1. The frame 11 is provided with a pair of working machine supporters 32 that supports a working machine (for example, a loader) attached to a front portion of the tractor 1.

The working machine supporters 32 are formed of plate shaped members protruding outward and extending upward from left and right side surfaces of the frame 11. The working machine supporters 32 have upper portions provided with a hole and a notch with which the working machine is attached.

The engine 12 is supported by the frame 11. The engine 12 burns fuel, and converts thermal energy thus obtained into kinetic energy. Thus, the engine 12 burns fuel to generate rotary driving force. An engine controller (not illustrated) is connected to the engine 12. When an operator operates the accelerator pedal 162 (see FIG. 7), the engine controller changes an operational state of the engine 12 in accordance with the operation. The engine 12 is provided with an exhaust gas purifier 12E. The exhaust gas purifier 12E oxidizes fine particles, carbon monoxide, hydrocarbon, and the like in exhaust gas.

The transmission 13 transmits the rotary driving force from the engine 12 to the front axle 14 and the rear axle 15. The transmission 13 receives the rotary driving force from the engine 12 via a connection mechanism. The transmission 13 is provided with a continuously variable transmission (I-HMT) 131 (see FIG. 5). When the operator operates the shift lever 163 (see FIG. 7), the continuously variable transmission 131 changes an operating state of the transmission 13 in accordance with the operation.

The front axle 14 transmits the rotary driving force from the engine 12 to front wheels 141. The front axle 14 receives the rotary driving force from the engine 12 via the transmission 13. A steering device (not illustrated) is arranged adjacent to the front axle 14. When the operator operates a steering wheel 164 (see FIG. 7), the steering device changes a steering angle of the front wheels 141 in accordance with the operation.

Figure 5:
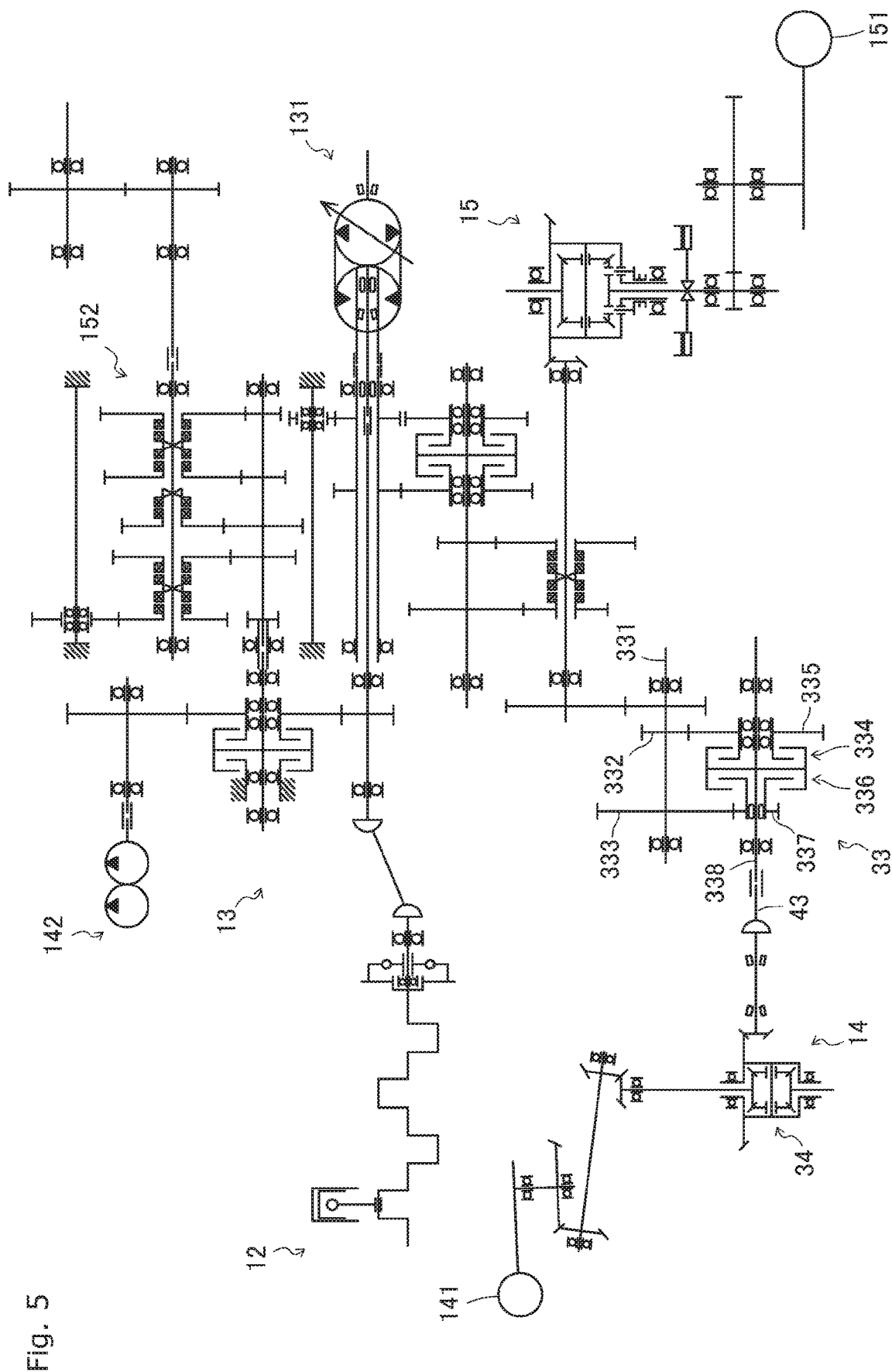
FIG. 5 is a diagram illustrating a power transmission system of the tractor.

The front axle 14 is provided with a hydraulic pump 142 (see FIG. 5). When the operator operates a joystick 176 (see FIG. 7), the hydraulic pump 142 transmits hydraulic pressure to the working machine attached to the front portion of the tractor 1 in accordance with the operation.

The rear axle 15 transmits the rotary driving force from the engine 12 to rear wheels 151. The rear axle 15 receives the rotary driving force from the engine 12 via the transmission 13. The rear axle 15 is provided with a PTO output device 152 (see FIG. 5). When the operator operates a PTO switch 165 (see FIG. 7), the PTO output device 152 transmits the rotary driving force to a working machine being pulled, in accordance with the operation. The rear axle 15 is also provided with a link mechanism 35 (see FIG. 6).

Next, a power transmission system of the tractor 1 is described.

FIG. 5 illustrates the power transmission system of the tractor 1. It is to be noted that each figure simply illustrates only portions required for the description of the present invention.

As described above, the transmission 13 transmits rotary driving force from the engine 12 to the front axle 14 and the rear axle 15. Thus, the transmission 13 has a mechanism for transmitting the rotary driving force to the front axle 14 and a mechanism for transmitting the rotary driving force to the rear axle 15. In this description, the mechanism for transmitting the rotary driving force to the front axle 14 is referred to as a front drive mechanism 33.

The front drive mechanism 33 includes a drive shaft 331, a constant-speed drive gear 332, and an acceleration drive gear 333. The front drive mechanism 33 further includes a constant speed clutch 334, a constant speed driven gear 335, an acceleration clutch 336, and an acceleration driven gear 337. The front drive mechanism 33 further includes an output shaft 338.

The drive shaft 331 is rotatably supported via a bearing. The constant-speed drive gear 332 is attached to the drive shaft 331. The acceleration drive gear 333 is also attached to the drive shaft 331. Thus, the constant-speed drive gear 332 and the acceleration drive gear 333 rotate while being integrated with the drive shaft 331.

The constant speed clutch 334 is rotatably supported via a bearing. The constant speed driven gear 335 is attached to an inner hub of the constant speed clutch 334 while meshing with the constant-speed drive gear 332. Thus, the constant speed driven gear 335 rotates while being integrated with the inner hub of the constant speed clutch 334. The acceleration clutch 336 is also rotatably supported via a bearing. The acceleration driven gear 337 is attached to an inner hub of the acceleration clutch 336 while meshing with the acceleration drive gear 333. Thus, the acceleration driven gear 337 rotates while being integrated with the inner hub of the acceleration clutch 336.

The output shaft 338 is rotatably supported via a bearing. The constant speed clutch 334 has an outer cylinder attached to the output shaft 338. Thus, the outer cylinder of the constant speed clutch 334 rotates while being integrated with the output shaft 338. The acceleration clutch 336 also has an outer cylinder attached to the output shaft 338. Thus, the outer cylinder of the acceleration clutch 336 rotates while being integrated with the output shaft 338.

With this structure, when the inner hub of the constant speed clutch 334 is coupled to the outer cylinder (when the constant speed clutch 334 operates), the rotation of the drive shaft 331 is transmitted to the output shaft 338. Then, a propeller shaft 43 rotates, and thus the front wheels 141 rotate via a differential mechanism 34. When the four-wheel drive is achieved with the constant speed clutch 334 operated, the rear wheels 151 and the front wheels 141 rotate at the same circumferential speed (referred to as constant speed four-wheel drive).

Similarly, also when the inner hub of the acceleration clutch 336 is coupled to the outer cylinder (when the acceleration clutch 336 operates), the rotation of the drive shaft 331 is transmitted to the output shaft 338. Then, the propeller shaft 43 rotates, and thus the front wheels 141 rotate via the differential mechanism 34. When the four-wheel drive is achieved with the acceleration clutch 336 operated, the front wheels 141 rotate with a higher circumferential speed than that of the rear wheels 151 (referred to as acceleration four-wheel drive).

Next, the link mechanism 35 of the tractor 1 is described.

Figure 6:
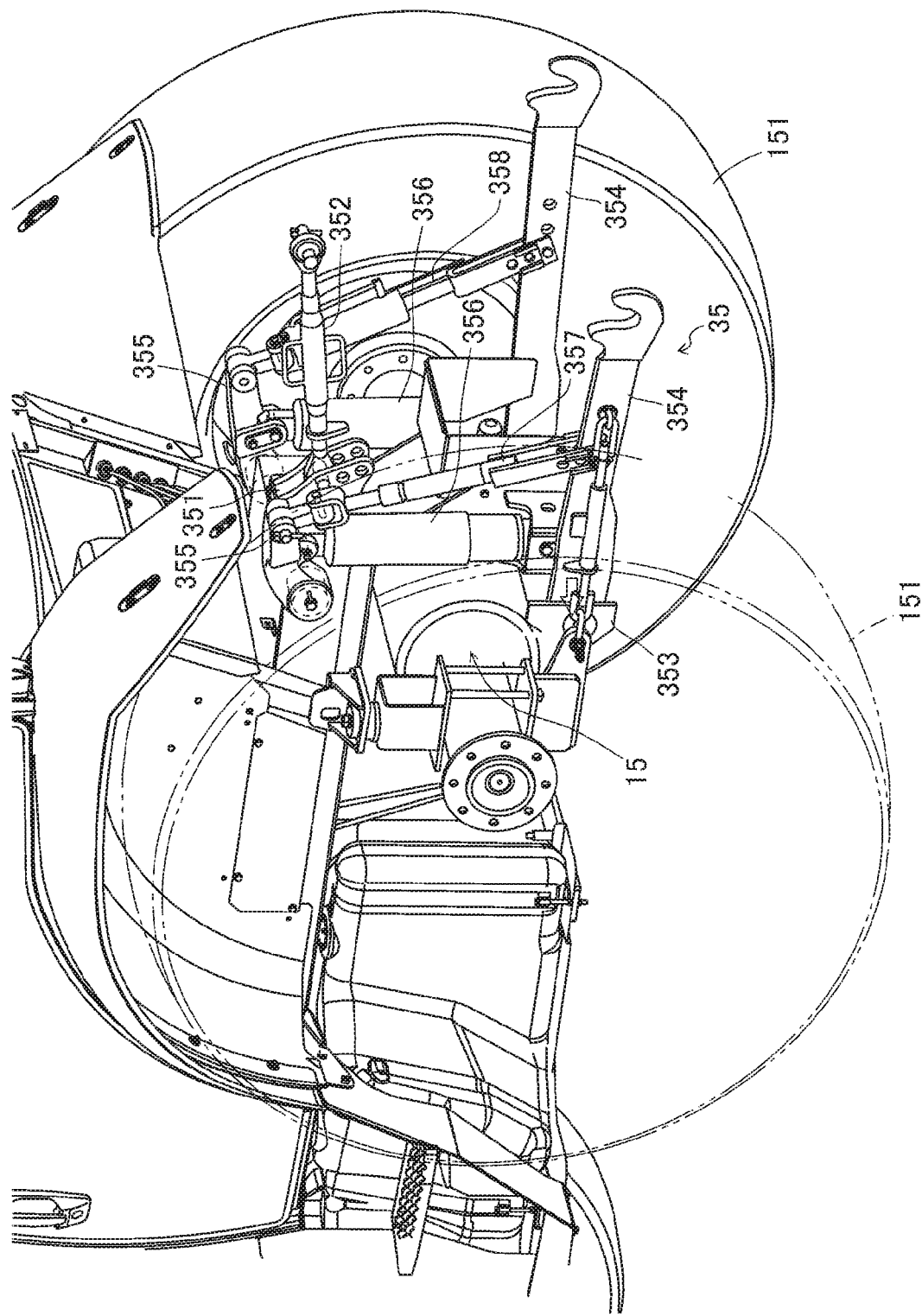
FIG. 6 is a diagram illustrating a link mechanism of the tractor.

FIG. 6 illustrates the link mechanism 35 of the tractor 1. The link mechanism 35 includes: a top bracket 351 attached to a rear portion of the rear axle 15; and a top link 352 attached to a hinge portion of the top bracket 351. The link mechanism 35 further includes: a lower bracket 353 attached to a lower portion of the rear axle 15; and a lower link 354 attached to a hinge portion of the lower bracket 353.

The link mechanism 35 further includes: lift arms 355 attached to side portions of the rear axle 15; a lifting and lowering actuator 356 attached to a center portion of the lift arm 355; a lift link 357 attached to the left lift arm 355 and the lower link 354; and an inclination actuator 358 attached to the right lift arm 355 and the lower link 354.

With the link mechanism 35 having this configuration, the working machine attached to the tractor 1 can be lifted, lowered, and inclined with three links including the top link 352 and the two lower links 354.

Next, the operation control room of the tractor 1 is described.

Figure 7:
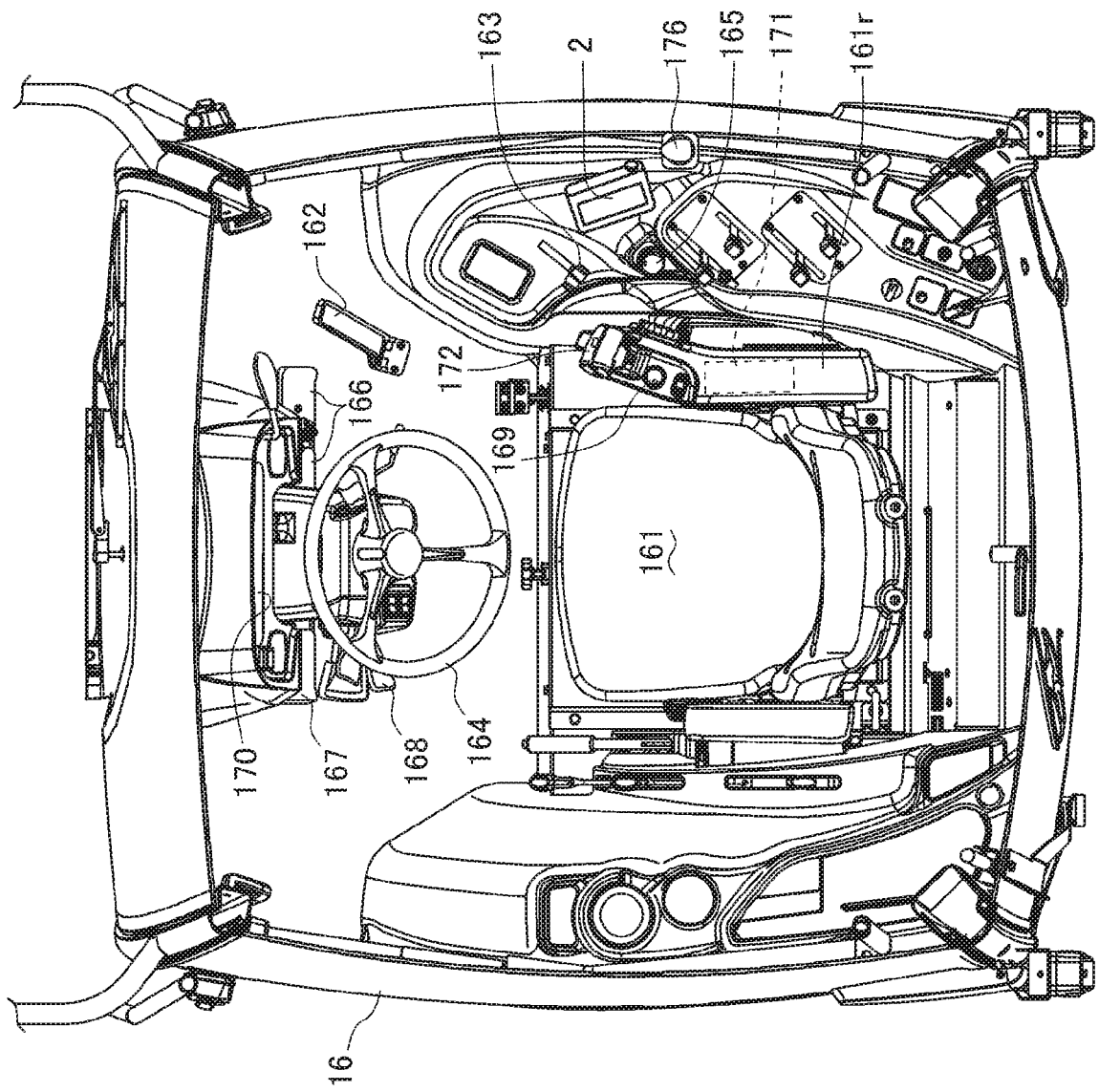
FIG. 7 is a diagram illustrating an operator's seat of the tractor and its periphery.
Figure 8:
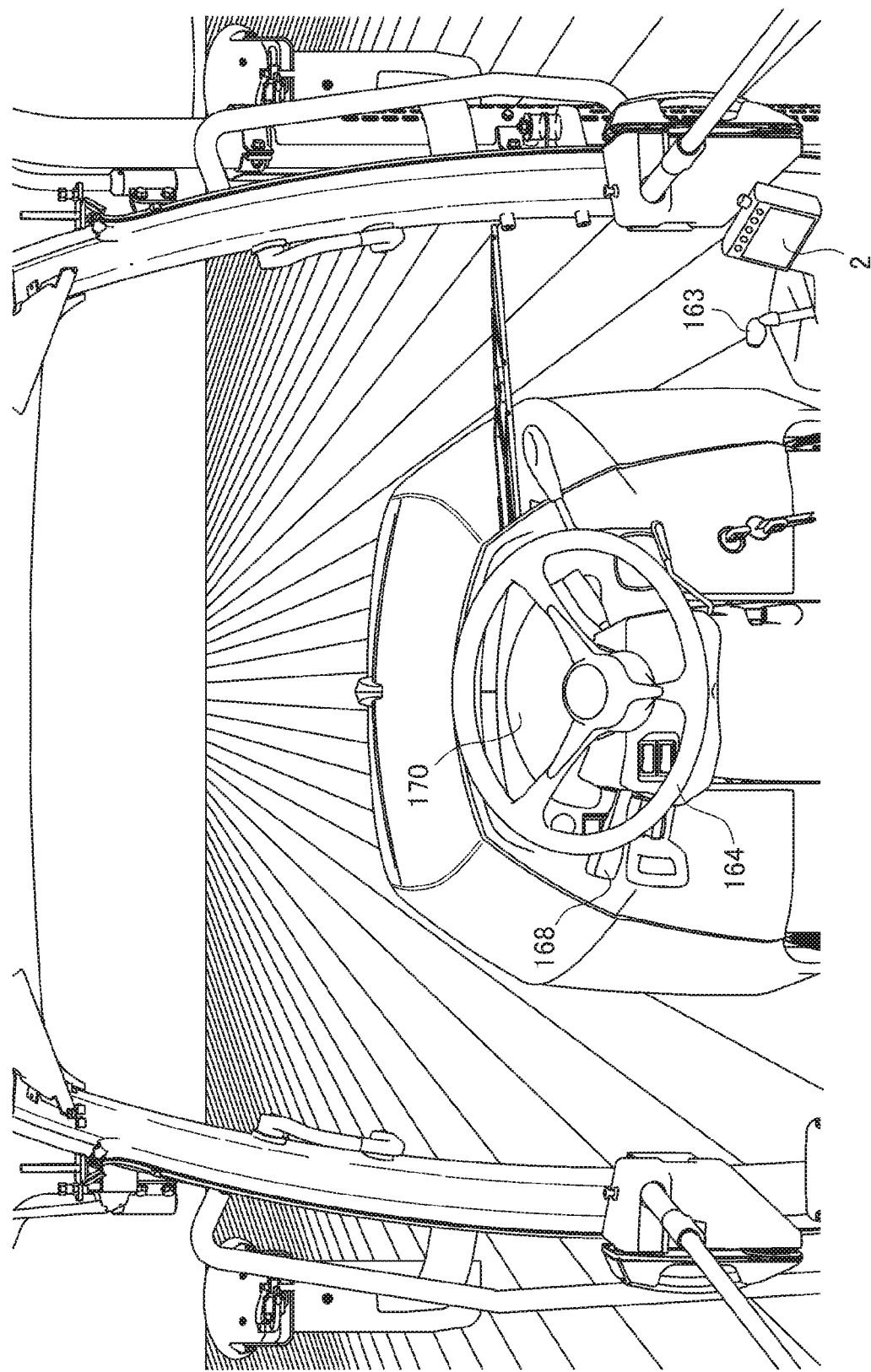
FIG. 8 is a diagram illustrating a field of view of an operator.
Figure 17:
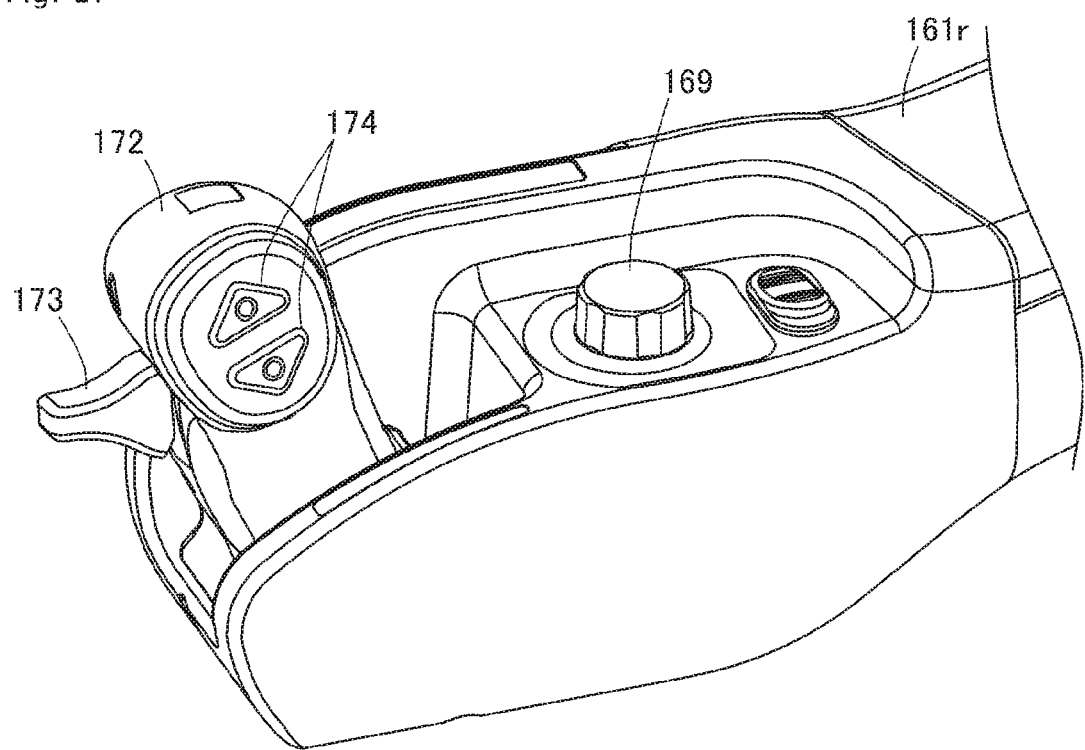
FIG. 17 is a diagram illustrating an operation control tool provided to an armrest.

FIG. 7 illustrates the operator's seat 161 and its periphery. FIG. 8 illustrates a field of view of the operator. FIG. 17 illustrates an operation control tool provided to an armrest 161*r*.

As described above, the cabin 16 has the inner side serving as the operation control room in which the operator's seat 161, the accelerator pedal 162, the shift lever 163, and the like are arranged. A brake pedal 166, a clutch pedal 167, a reverser lever 168, a speed dial 169, an instrument panel 170, a control panel 171, a transmission lever 172, a working machine lifting/lowering switch 173, working machine lifting/lowering fine-control switches 174, and the like are arranged in the periphery of the operator's seat 161. The operator can operate the accelerator pedal 162, the shift lever 163, and the like while being seated on the operator's seat 161 to operate the tractor 1.

The control panel 171 is disposed in the armrest 161*r* that can be opened and closed, and is connected to the control device 3. The control panel 171 is an operation tool for performing various settings related to the working machine. The operator can perform various settings suitable for the connected working machine, by operating the control panel 171.

The transmission lever 172 is disposed on an upper surface of the front portion of the armrest 161*r*, and is connected to the control device 3. When the operator inclines the transmission lever 172 having a pivotable structure as appropriate, a shifting operation is performed. Thus, the operator can freely adjust the traveling speed.

The working machine lifting/lowering switch 173 is provided on the front surface of the transmission lever 172 (see FIG. 17). The working machine lifting/lowering switch 173 is a slidable switch for lifting and lowering the working machine attached to the rear portion of the tractor 1. The working machine lifting/lowering switch 173 is connected to the control device 3. When the working machine lifting/lowering switch 173 is slid upward, the working machine is lifted. When the working machine lifting/lowering switch 173 is slid downward, the working machine is lowered. Thus, the operator can freely lift and lower the working machine attached to the rear portion of the tractor 1.

A pair of upper and lower working machine lifting/lowering fine-control switches 174 are provided on a left surface of the transmission lever 172 (see FIG. 17). The working machine lifting/lowering switches 174 are push switches for lifting and lowering the working machine attached to a rear portion of the tractor 1, within a small range. The working machine lifting/lowering fine-control switches 174 are connected to the control device 3. The working machine is lifted within a small range when the upper switch is pressed, and is lowered in a small range when the lower switch is pressed. Thus, the operator can freely lift and lower the working machine attached to the rear portion of the tractor 1. Thus, the operator can roughly adjust the height of the working machine with the working machine lifting/lowering switch 173 and then finely adjust the height with the working machine lifting/lowering fine-control switches 174.

The joystick 176 is disposed on the right side of the operator's seat 161 (see FIG. 7). The operator can operate the working machine (for example, a loader) attached to the front portion of the tractor 1, by operating the joystick 176 while being seated on the operator's seat 161.

The tractor 1 includes a display 2 disposed close to the operator's seat 161. The display 2 is disposed on a front right side of the operator's seat 161 so as to be operable with the right hand of the operator. An information network of the tractor 1 is briefly described below. Furthermore, the display 2 and a control system including the display 2 are described in detail below.

Figure 9:
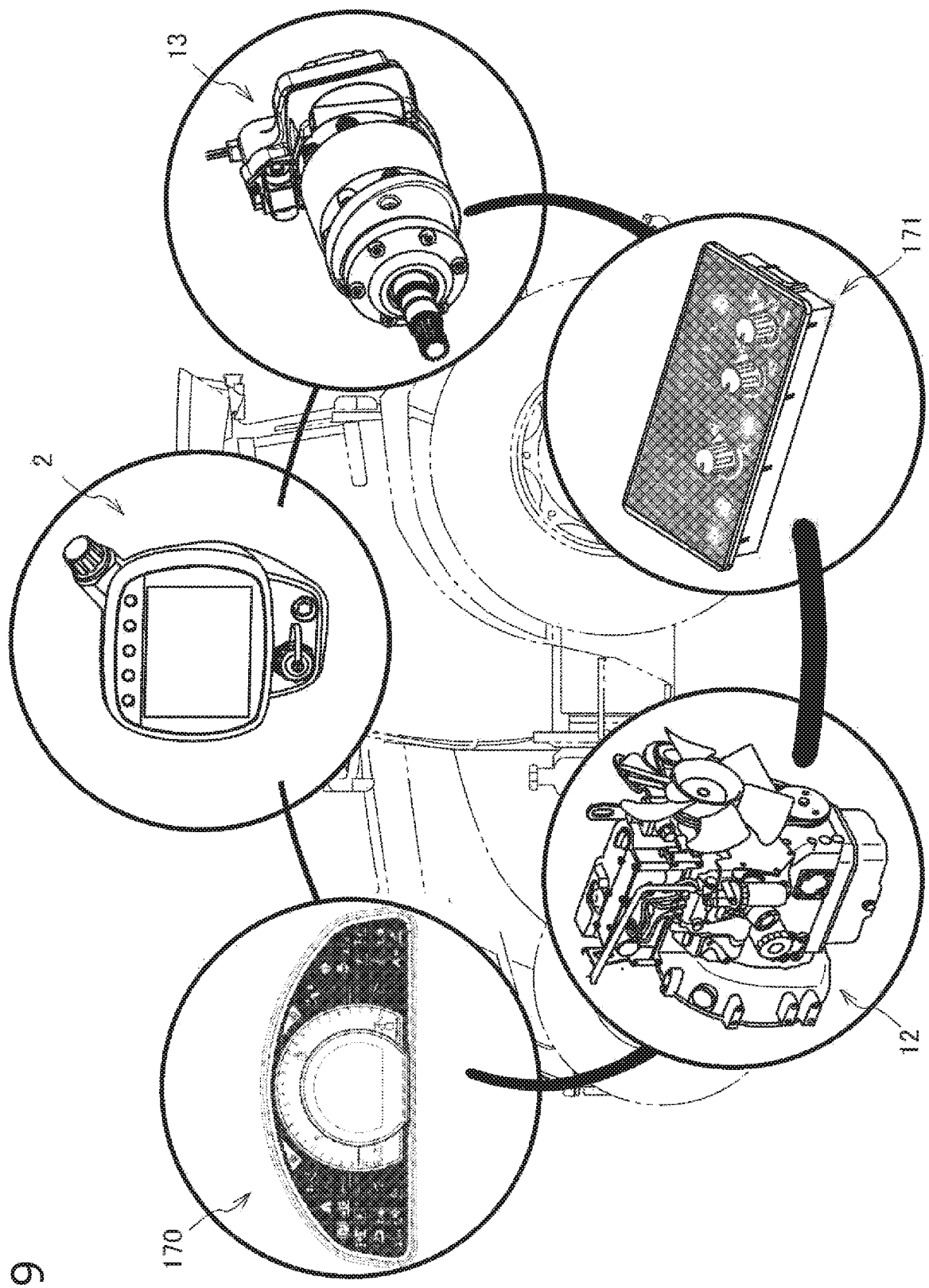
FIG. 9 is a diagram illustrating an information network of the tractor.
Figure 10:
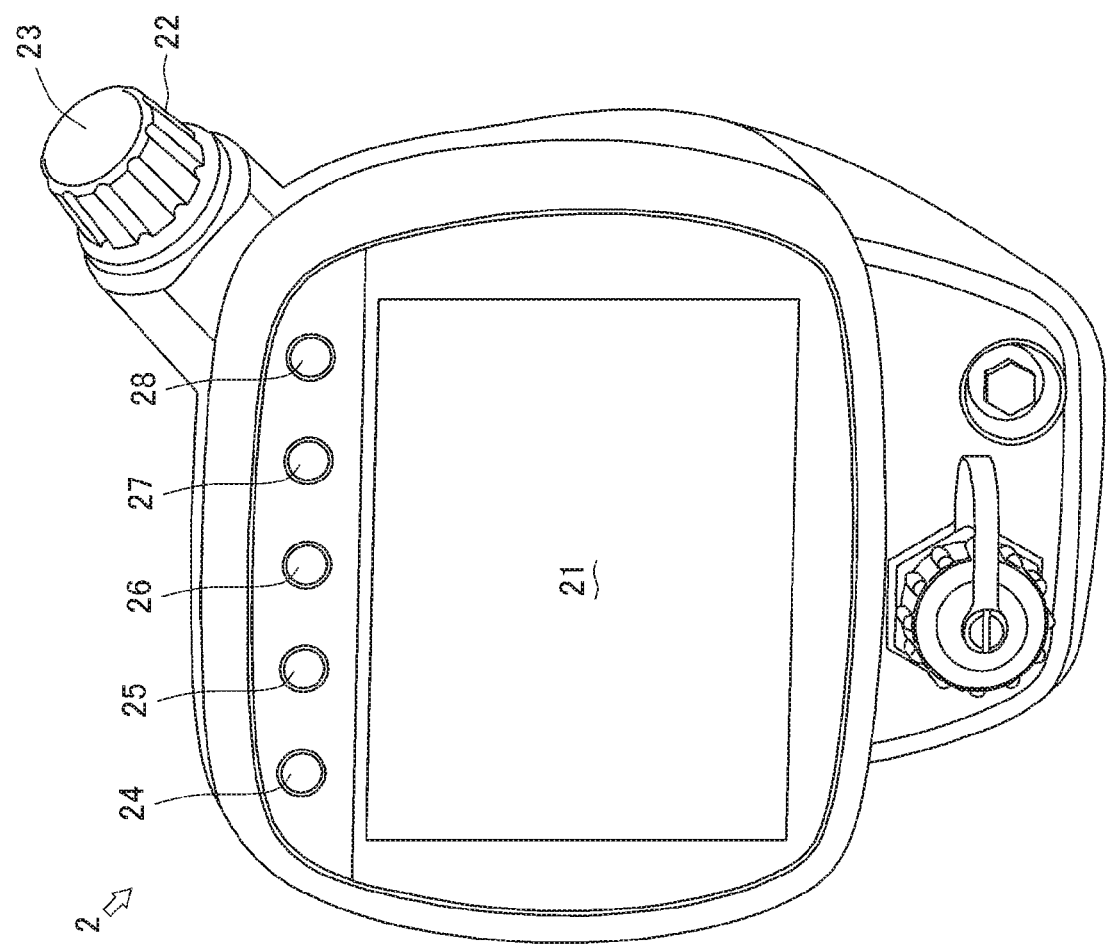
FIG. 10 is a diagram illustrating a display.
Figure 11:
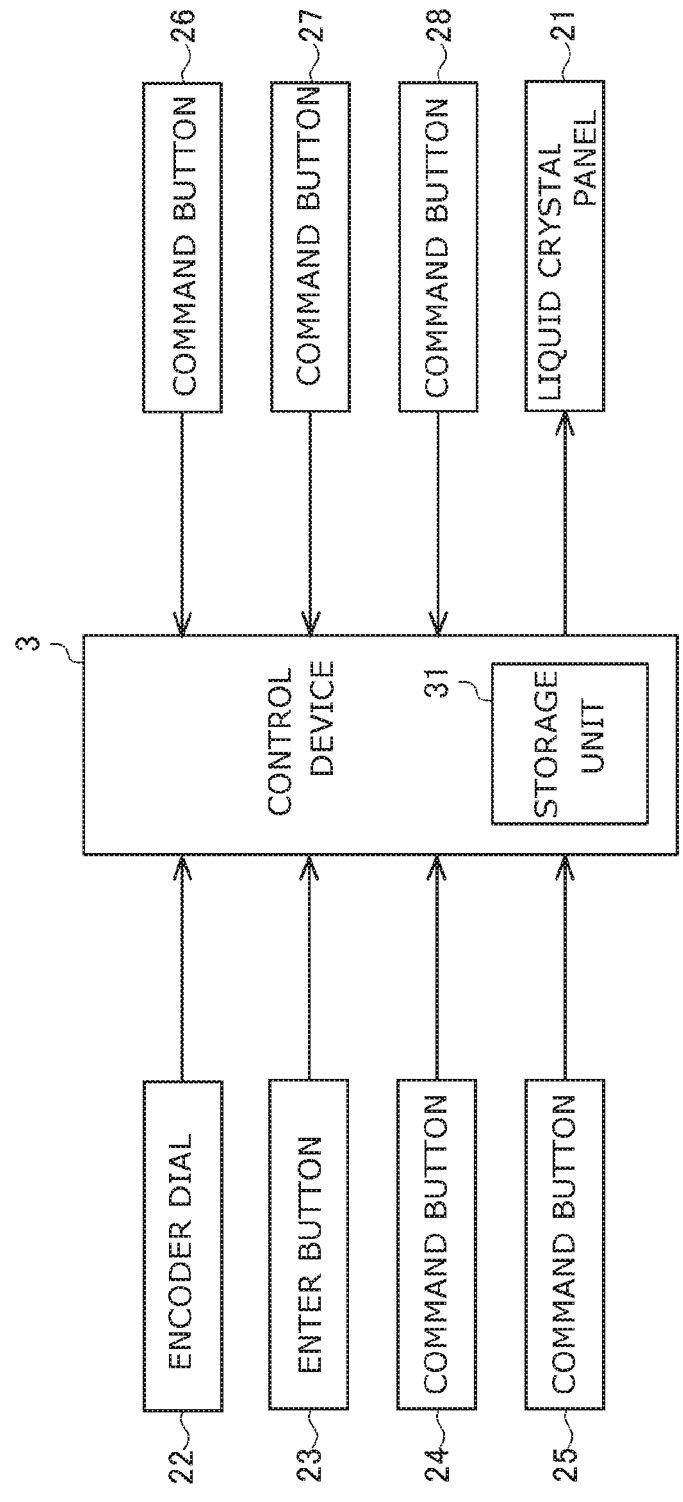
FIG. 11 is a diagram illustrating a portion of a control system of the tractor related to the display.

FIG. 9 illustrates the information network of the tractor 1. FIG. 10 illustrates the display 2. FIG. 11 illustrates a portion of the control system of the tractor 1 related to the display 2. The control device 3 includes a storage unit 31, and can store information required for the control. The storage unit 31 may be provided outside the control device 3.

The tractor 1 has the information network installed over various locations to achieve the maximum performance. Specifically, the transmission 13, the instrument panel 170, the control panel 171, and the display 2 form a controller area network (CAN) together with the engine 12 so that the components can share information with each other.

Figure 18:
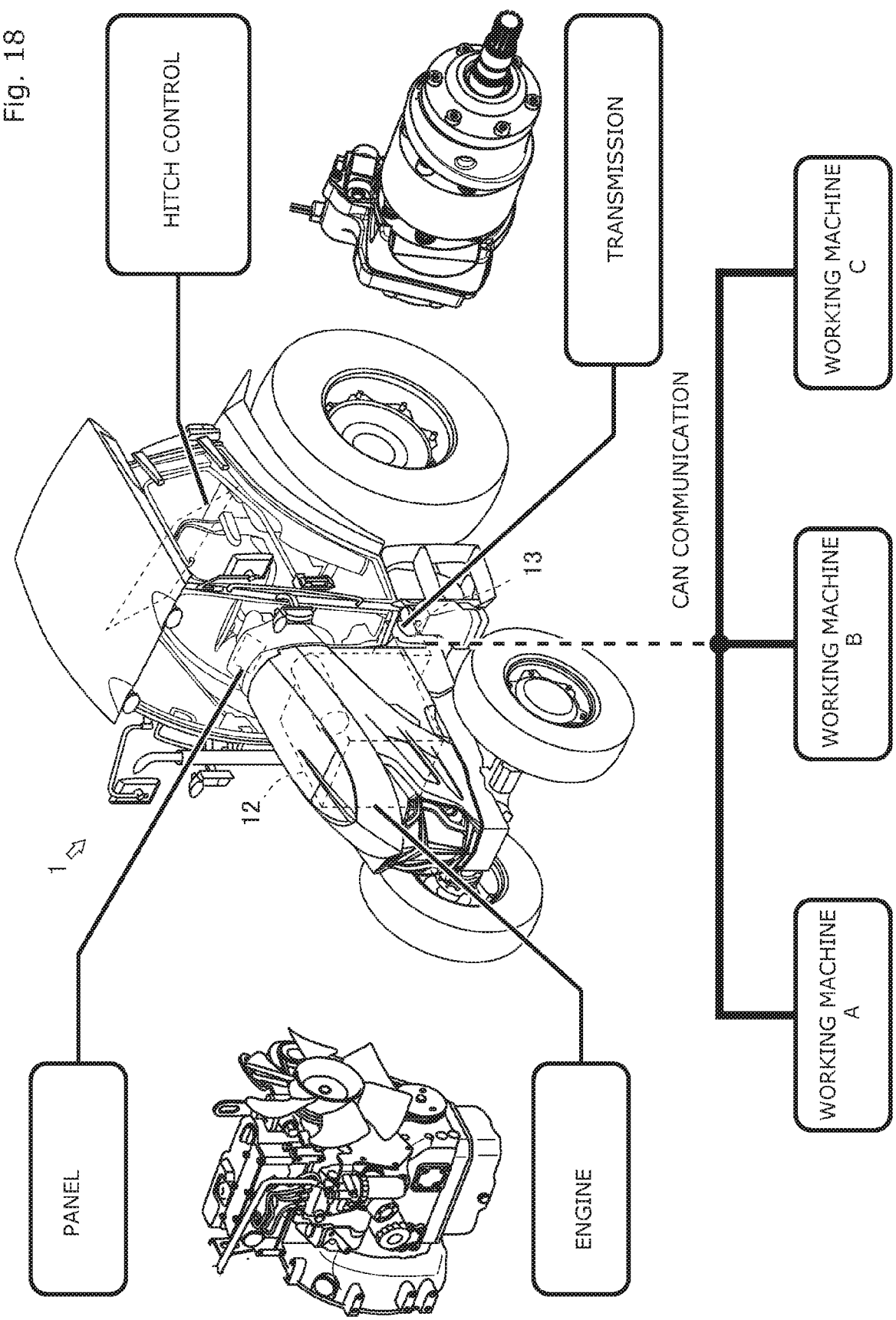
FIG. 18 is a diagram illustrating an example of a CAN.

As illustrated in FIG. 18, the CAN may include the working machine. Examples of information communicated between the tractor 1 and working machines A to C include: rotation speed and water temperature of the engine 12; vehicle speed; a transmission stage; a state of the transmission 13; and a state of the link mechanism 35 (depth, inclination, or the like). The engine 12, the transmission 13, and the link mechanism 35 are collectively controlled by the control device 3, and information on these and warning are displayed on the instrument panel 170 or the display 2. Sophisticated control can be achieved with these various pieces of information transmitted between the tractor 1 and the working machines A to C. Thus, higher operability and work efficiency can be achieved, and a load on the operator can be reduced.

Figure 19:
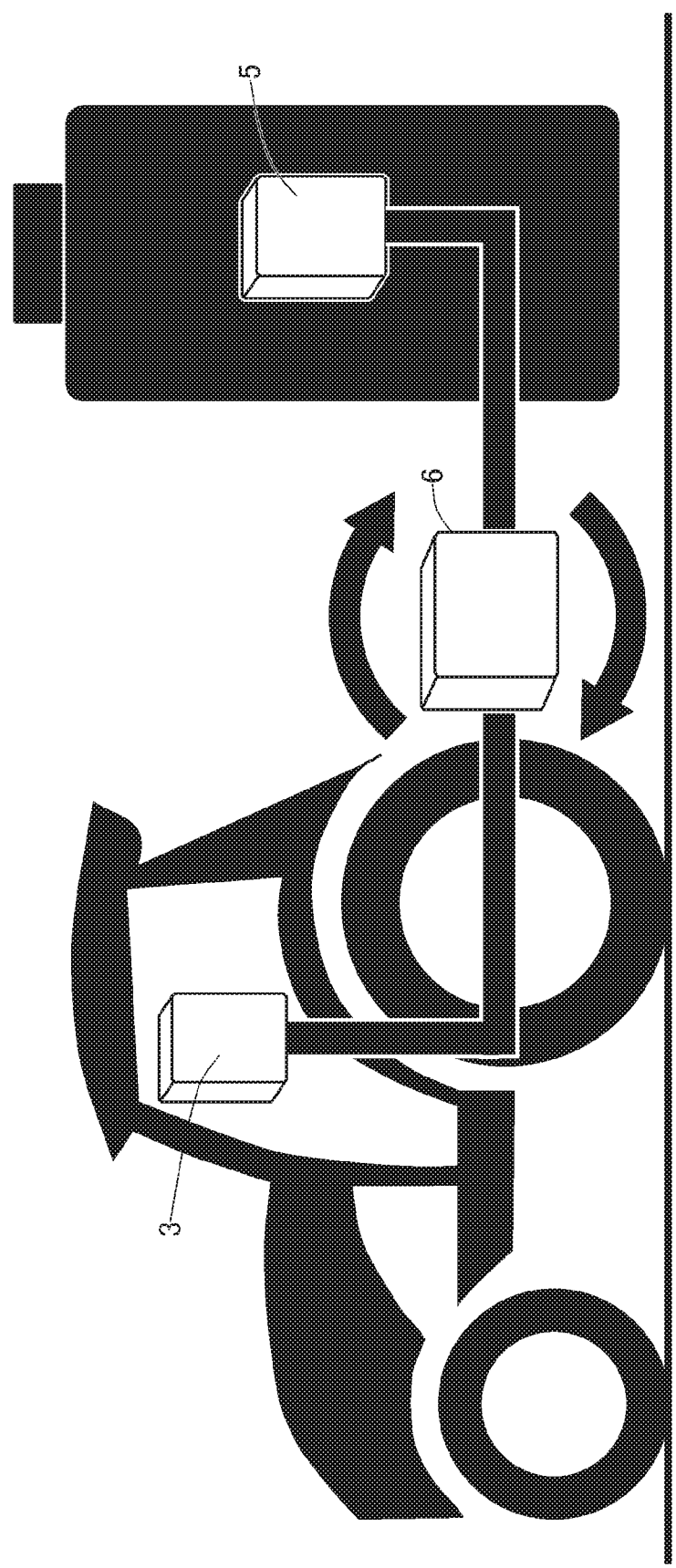
FIG. 19 is a diagram schematically illustrating the CAN connection between the tractor and a working machine.

FIG. 19 is a diagram schematically illustrating the CAN connection between the tractor 1 and the working machine. As illustrated in FIG. 19, the control device 3 serving as the tractor side controller is provided to the tractor 1, and a working machine side controller 5 for controlling the working machine is provided to the working machine. The tractor side controller and the working machine side controller 5 are connected to each other via a connector 6. The connector 6 may be a connector of the AG-PORT standard or the ISOBUS standard. Thus, bidirectional communications may be performed between the tractor side controller and the working machine side controller 5. Thus, for example, the lever and the like on the side of the tractor 1 can be assigned the operation of the working machine, and thus more consistent operability can be achieved. Furthermore, the cabin 16 can incorporate less wiring.

Figure 20:
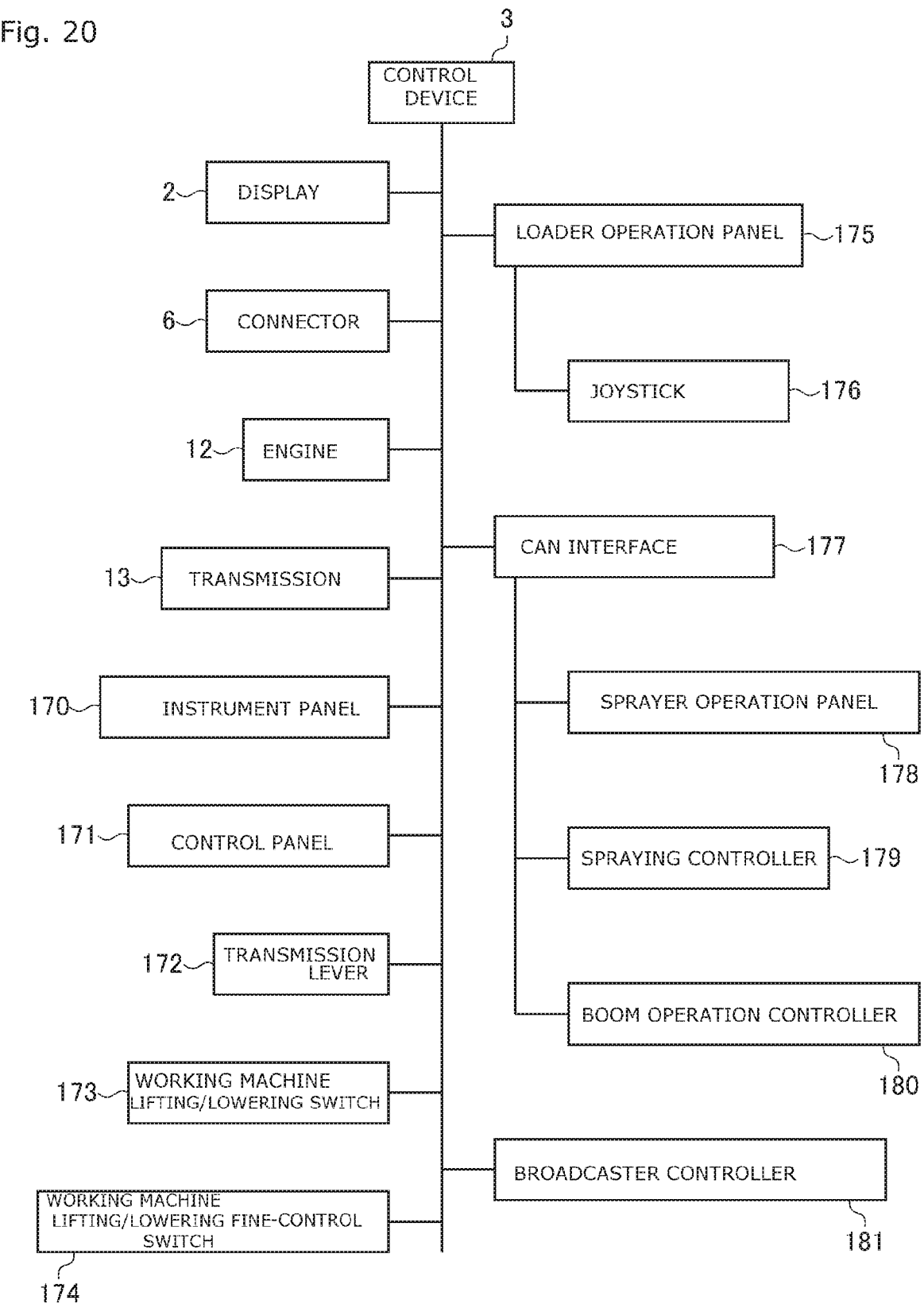
FIG. 20 is a block diagram illustrating a configuration of the CAN in the tractor.

FIG. 20 is a block diagram illustrating a configuration of the CAN in the tractor 1. An example where a loader, a sprayer, and a broadcaster serving as working machines can be connected to the CAN of the tractor 1 is described with reference to FIG. 20. The display 2, the connector 6, the engine 12, the transmission 13, the instrument panel 170, the control panel 171, the transmission lever 172, the working machine lifting/lowering switch 173, the working machine lifting/lowering fine-control switches 174, a loader operation panel 175, a CAN interface 177, and a broadcaster controller 181 are connected to the control device 3 serving as the tractor side controller via the CAN. The joystick 176 is connected to the loader operation panel 175. A sprayer operation panel 178, a spraying controller 179, and a boom operation controller 180 are connected to the CAN interface 177.

The loader operation panel 175 is a dedicated operation tool for setting up the loader. The operator can perform various setting related to the loader by operating the loader operation panel 175. Thus, the control device 3 can acquire the information related to the content set with the loader operation panel 175. The operator can operate the loader in accordance with various settings, by operating the joystick 176.

The CAN interface 177 is an interface for connecting the sprayer operation panel 178, the spraying controller 179, and the boom operation controller 180 to the control device 3 via the CAN.

The sprayer operation panel 178 is a dedicated operation tool for setting up the sprayer. The operator can perform various settings (such as a setting on the amount of pesticide sprayed per unit area) related to the sprayer by operating the sprayer operation panel 178. Thus, the control device 3 can acquire information related to the content set with the sprayer operation panel 178.

The spraying controller 179 is used for performing opening/closing operation for spray valves through which pesticides are supplied to spray nozzles. The control device 3 acquires the information related to the state of the spray valves set with the spraying controller 179, and controls the spray valves. Thus, the operator can adjust the spraying start/end timing and the spraying amount of the pesticides by operating the spraying controller 179.

The boom operation controller 180 is operated for adjusting the extending/contracting, inclination, opening/closing, and lifting/lowering of a boom. The control device 3 acquires information on the state of the boom set with the boom operation controller 180, and controls the boom. Thus, the operator can adjust the extending/contracting, inclination, opening/closing, and lifting/lowering of the boom by operating the boom operation controller 180.

The broadcaster controller 181 is operated for adjusting the spraying start/end timing and the spraying amount of the broadcaster. The control device 3 acquires information related to the state of the broadcaster set by the broadcaster controller 181, and controls the broadcaster. Thus, the operator can adjust the spraying start/end timing and the spraying amount of the broadcaster by operating the broadcaster controller 181.

In the tractor 1, the display 2 is disposed on a side console (see FIGS. 7 and 8). The display 2 includes a liquid crystal panel (display unit) 21, an encoder dial (operation unit) 22, an enter button (operation unit) 23, and five command buttons (operation unit) 24 to 28 integrally provided (see FIG. 10).

The liquid crystal panel 21 is provided at the center of the front surface of the display 2. The liquid crystal panel 21 can display a predetermined screen based on an instruction from the control device (control unit) 3. For example, the liquid crystal panel 21 can display an opening screen S1 (see FIG. 12) based on an instruction from the control device 3. The liquid crystal panel 21 can display other screens (see FIG. 13 to FIG. 16) based on instructions from the control device 3. The display unit is not limited to the liquid crystal panel 21, and may be a thin display panel such as an electroluminescence (EL) panel using organic EL or inorganic EL.

The encoder dial 22 is provided on an upper right side of the display 2. The encoder dial 22 incorporates a rotary encoder, and can transmit an intension of the operator (selection operation), to scroll a tab or shift a highlighted display, to the control device 3 for selecting an element (item) displayed on the liquid crystal panel 21. For example, the encoder dial 22 can transmit an intension of the operator for scrolling a tab for selecting among displayed numbers and alphabets, to the control device 3 (see FIG. 13). The encoder dial 22 can transmit an intension of the operator to shift a highlighted display, for selecting a displayed icon, to the control device 3 (see FIG. 14 to FIG. 16).

The enter button 23 is integrally formed with the encoder dial 22. The enter button 23 is an operation button corresponding to the upper and lower movement of the encoder dial 22, and is operated by pressing the upper surface of the encoder dial 22. The enter button 23 may be a push button provided on an upper end surface of the encoder dial 22.

The enter button 23 can transmit an intension of the operator (determination operation) to determine one of the elements (items) displayed on the liquid crystal panel 21 to the control device 3. For example, the enter button 23 can transmit an intension of the operator to determine one of the displayed numbers or alphabets, to the control device 3 (see FIG. 13). The enter button 23 can transmit an intension of the operator to determine one of the displayed icons, to the control device 3 (see FIG. 14 to FIG. 16).

The five command buttons 24 to 28 are operation buttons for performing an operation for determining an icon displayed in the upper end of the screen. The command buttons 24 to 28 are arranged side by side in the upper portion of the front surface of the display 2. The command buttons 24 to 28 each correspond to an icon immediately therebelow on the liquid crystal panel 21. The command buttons 24 to 28 can each transmit an intension of the operator to determine a corresponding one of the icons to the control device 3. When any one of the command buttons 24 to 28 is pressed, the control device 3 executes a command related to the corresponding icon. The icon and command assigned to each of the command buttons 24 to 28 differ among the screens. Thus, required icons and commands are assigned to each screen.

The commands include: a command (corresponding icon is "HOME") for instructing switching to a first home screen S3, a command (corresponding icon is "free 1" or "free 2") for instructing switching to a shortcut screen (a screen freely set by the operator), a command (corresponding icon is "determine"), with a similar function as the enter button 23, for instructing determination of an element, a command (corresponding icon is "return") for instructing switching to a previous screen, and a command (corresponding icon is an arrow indicating a certain direction) for instructing a direction in which a tab is scrolled and a direction in which the highlighted display is shifted.

The liquid crystal panel 21 may be provided with a touch panel as the operation unit. In this configuration, the encoder dial 22, the enter button 23, and the command buttons 24 to 28 can be omitted as appropriate.

Some working machines can be interlocked with the tractor 1. When the working machine that can be interlocked is attached to the tractor 1, the tractor 1 and the working machine can operate in an interlocking manner. The interlocking manner means that the tractor 1 operates in an optimum manner in accordance with an operation of the working machine. The interlocking manner may also mean that the working machine operates in an optimum manner in accordance with an operation of the tractor 1. The working machine that can be interlocked with the tractor 1 includes a loader attached to the front portion, as well as a sprayer and a broadcaster attached to the rear potion, and the like.

For example, when the loader is attached to the tractor 1 in the interlocking manner, the tractor 1 is automatically controlled under a setting optimum for the loader. As a specific example, control may be performed in such a manner that the acceleration four-wheel drive is automatically switched to the constant speed four-wheel drive for safety purposes. In a case where the loader is expected to be lifted, such as a case where the loader has been detected to be knocked down, control is performed in such a manner that the engine rotation speed increases, whereby the loader can be lifted at a higher speed.

In this context, the storage unit 31 stores a list of working machines that can be interlocked. The control device 3 reads the list of working machines that can be interlocked from the storage unit 31, generates an interlocking working machine screen S5 (see FIG. 16), and performs control in such a manner that the liquid crystal panel 21 displays the screen. Specifically, the interlocking working machine is added as one menu to the screen (see, for example, a second home screen S4), on which a plurality of menus are displayed in a selectable manner. When an operation of selecting and determining the interlocking working machine is performed, the interlocking working machine screen S5 can be displayed. The interlocking working machine screen S5 displays the attached interlocking working machines in a selectable manner, and the interlocking working machines in an identifiable manner.

The selectable manner means that the display can be in any format as long as the operator can select the desired working machine. For example, the desired working machine may be selectable through shifting the highlighted display by operating the operation unit (encoder dial 22, enter button 23, command buttons 24 to 28). The identifiable manner means that the display can be in any format as long as the operator can identify the currently interlocked working machine. For example, the identifiable manner can be achieved with a mark (such as ON display), indicating that the machine is currently interlocked, displayed on the icon of the working machine that is currently interlocked in an overlapping manner, and with a mark (such as OFF display), indicating that the machine is not currently interlocked, displayed on the icon of the working machine that is currently not interlocked in an overlapping manner.

The working machine that can be interlocked but is not attached is displayed in an identifiable and non-selectable manner. For example, the icon may be grayed out so as to be identifiable as a working machine that is not attached, and controlled in such a manner as not to be selectable by operating the operation unit. Thus, the operator can enjoy higher convenience with the working machine that can be interlocked but is not attached being immediately identifiable. The working machine that is not attached cannot be selected, and thus is prevented from being accidentally selected by the operator.

The control device 3 receives selection using the operation unit (encoder dial 22, enter button 23, command buttons 24 to 28) and the determination operation on the interlocking working machine screen S5, and performs control such that the working machine determined through the operation is stored in the storage unit 31.

When a desired working machine is determined through an operation on the interlocking working machine screen S5, the control device 3 performs control in such a manner that the working machine determined by the operation is interlocked with the interlocking of the interlocked working machine released. Thus, even when the working machines are attached to the front and rear of the tractor 1, only one working machine is interlocked at a time, whereby the control on the tractor 1 is prevented from being hindered.

The control device 3 performs control in such a manner that the working machine that is attached and can be interlocked is detected at a predetermined interval (for example, once in every 10 minutes, or when the operation of determining the interlocking working machine is performed on the second home screen S4). Whether a working machine can be interlocked can be determined in accordance with communications with the working machine. Thus, the interlocking working machine screen S5 can always display the latest state.

With the display 2 on which the interlocking state of the working machine with respect to the working machine is operated and displayed thus provided to the tractor 1, the operator can set and check the interlocking state of the working machine on the side of the tractor 1. Thus, the operator on the tractor 1 can check the currently interlocked working machine and set the working machine to be interlocked, while being on the tractor 1, that is, without getting off the tractor 1 and moving to the working machine, and thus can enjoy a higher work efficiency.

Furthermore, the unit for operating and displaying the interlocking state with respect to the tractor 1 can be omitted from the working machine, and thus a cost reduction can be achieved. When the unit for operating and displaying the interlocking state with respect to the tractor 1 is provided to the working machine, the operator can set and check the interlocking state on the tractor 1 and on the working machine and thus can enjoy a higher operability.

A screen displayed on the display 2, related to the interlocking between the tractor 1 and the working machine, and how the display 2 is operated are described below.

FIG. 12 to FIG. 16 illustrate a screen displayed on the display 2. It is to be noted that each figure simply illustrates only portions required for the description of the present embodiment.

Figure 12:
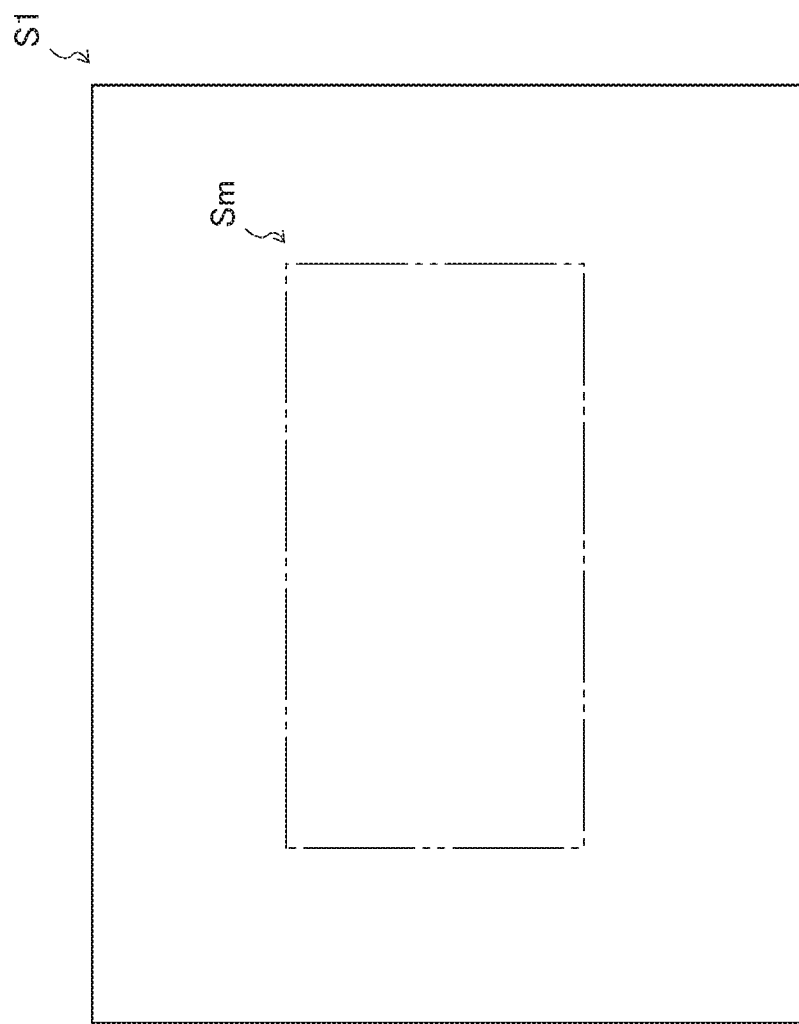
FIG. 12 is a diagram illustrating a screen displayed on the display.

First of all, an opening screen S1 is displayed on the display 2 (see FIG. 12). In the opening screen S1, a symbol mark Sm is displayed at a portion around the center. The symbol mark Sm is a design representing a supplier/manufacturer. The symbol mark Sm appears on a black background image, and gives a strong impression to the operator.

Figure 13:
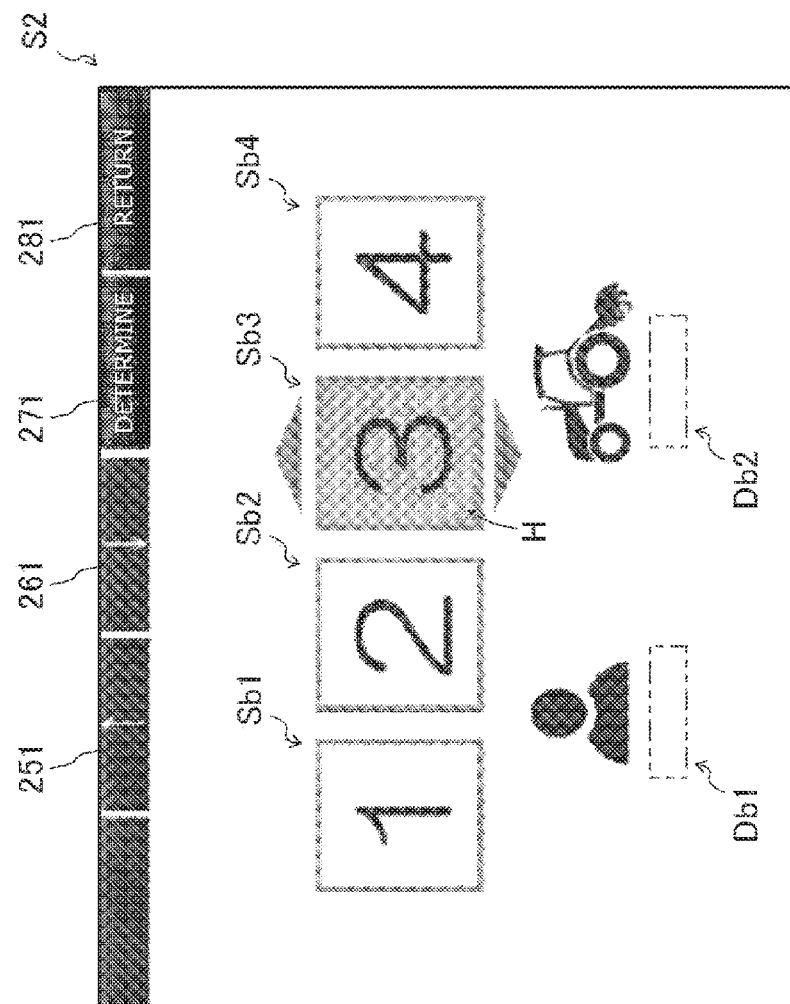
FIG. 13 is a diagram illustrating a screen displayed on the display.

Next, the display 2 displays an unlock screen S2 (see FIG. 13). The unlock screen S2 display four scroll boxes Sb1 to Sb4 for inputting a single row of PIN code. A selected one of the scroll boxes Sb1 to Sb4 is displayed in a highlighted manner (see a section H in the figure). In the scroll boxes Sb1 to Sb4, any one of the numbers 0 to 9 and alphabets A to F can be selected through vertical scrolling.

The unlock screen S2 displays icons 251, 261, 271, 281 corresponding to the command buttons 25 to 28 at the upper end. The unlock screen S2 displays a dialog box Db1 in which an operator name is displayed, and a dialog box Db2 in which a working machine name is displayed. The operator can check whether the operator name and the working machine name are correctly set with these dialog boxes Db1 and Db2.

The operator can select a number or an alphabet by rotating the encoder dial 22 through scrolling, and determine the number or the alphabet by pressing the enter button 23. In the unlock screen S2, the command button 25 or 26 can be pressed to select between the numbers or alphabets through scrolling, and determine the number or alphabet by pressing the command button 27. The determination may be cancelled by pressing the command button 28. When an incorrect PIN code is input, a message indicating that the number is incorrect is displayed.

Figure 14:
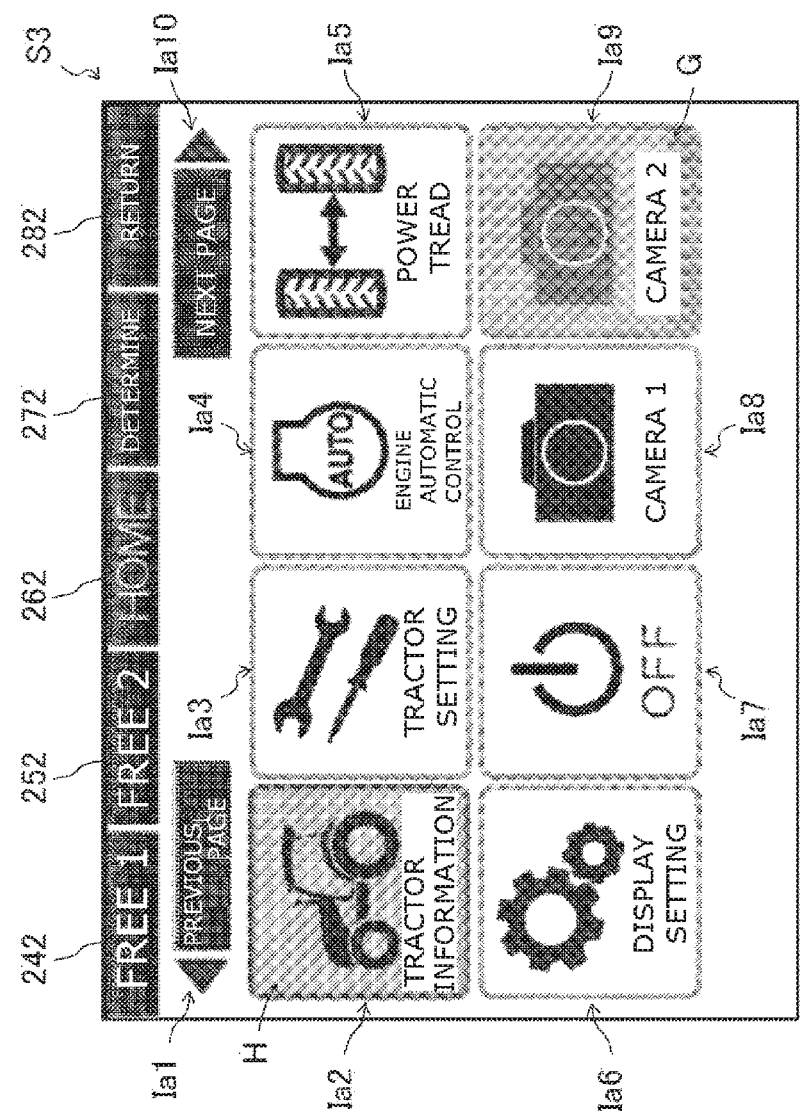
FIG. 14 is a diagram illustrating a screen displayed on the display.

Next, the display 2 displays the first home screen S3 (see FIG. 14). The first home screen S3 displays icons Ia1 to Ia10 for selecting a menu or a page. Selected one of the icons Ia1 to Ia10 is displayed in a highlighted manner (see a section H in the figure). The highlighted display is shifted by rotation of the encoder dial 22. Icons that cannot be selected are grayed out (see a section G in the figure). The first home screen S3 displays icons 242, 252, 262, 272, and 282, corresponding to the command buttons 24 to 28, at the upper end.

How the icon 242 corresponding to "free 1" and the icon 252 corresponding to "free 2" are registered is briefly described with registration for "free 1" as an example. First of all, the command button 24 associated with the icon 242 corresponding to "free 1" is long pressed (for example, for 3 minutes) to cause transition to the registration screen (not illustrated). Then, the encoder dial 22 is operated with the registered screen displayed, to select a desired icon (for example, the icon "OFF") and the enter button 23 is pressed. Thus, this icon is registered to the icon 242 corresponding to "free 1", and the icon is displayed instead of "free 1".

While the first home screen S3 is displayed, the operator can select the desired one of icons Ta1 to Ia10 by rotating the encoder dial 22, and can determine the icon by pressing the enter button 23 or the command button 27. Here, the icon Ia10 with a description "next page" is selected and determined.

Figure 15:
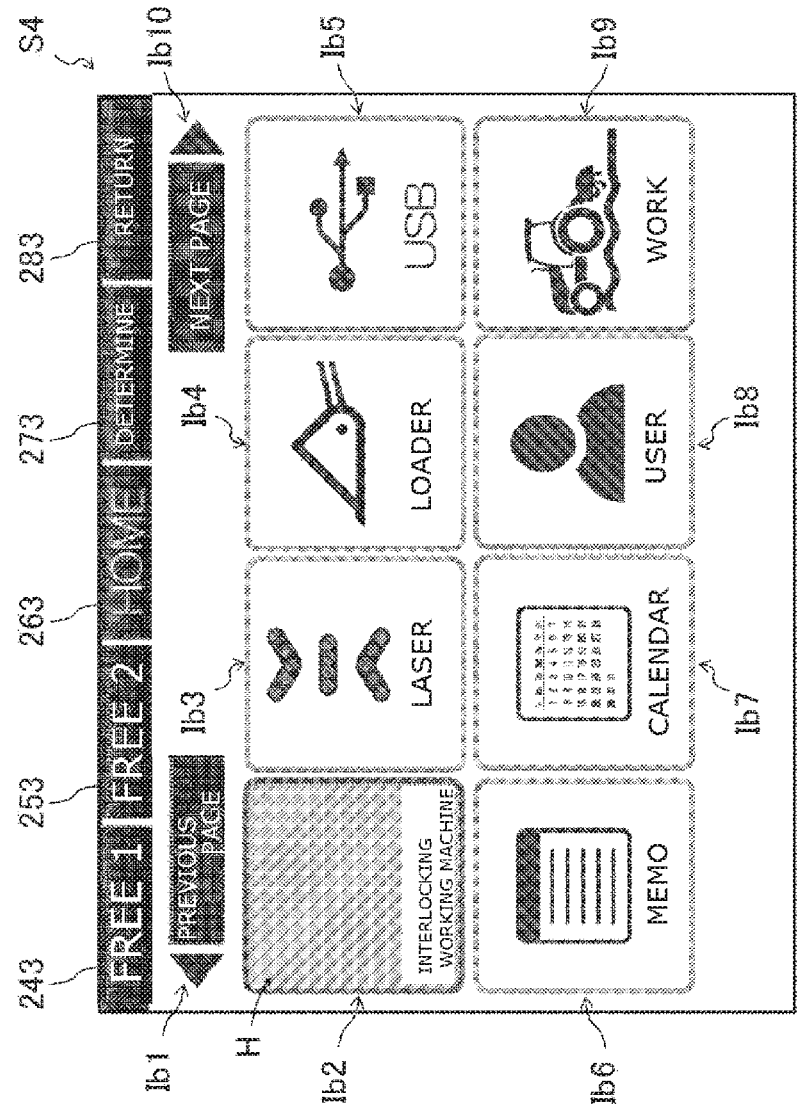
FIG. 15 is a diagram illustrating a screen displayed on the display.

Next, the display 2 displays the second home screen S4 (see FIG. 15). The second home screen S4 displays icons Ib1 to Ib10. The selected one of the icons Ib1 to Ib10 is displayed in a highlighted manner (see the section H illustrated in the figure). The highlighted display is shifted by rotation of the encoder dial 22. The second home screen S4 displays icons 243, 253, 263, 273, and 283, corresponding to the command buttons 24 to 28, at the upper end.

In the second home screen S4, the operator can select the desired one of the icons Ib1 to Ib10 by rotating the encoder dial 22, and determine the icon by pressing the enter button 23 or the command button 27. Here, the icon Ib2, with a description "interlocking working machine", is selected and determined.

Figure 16:
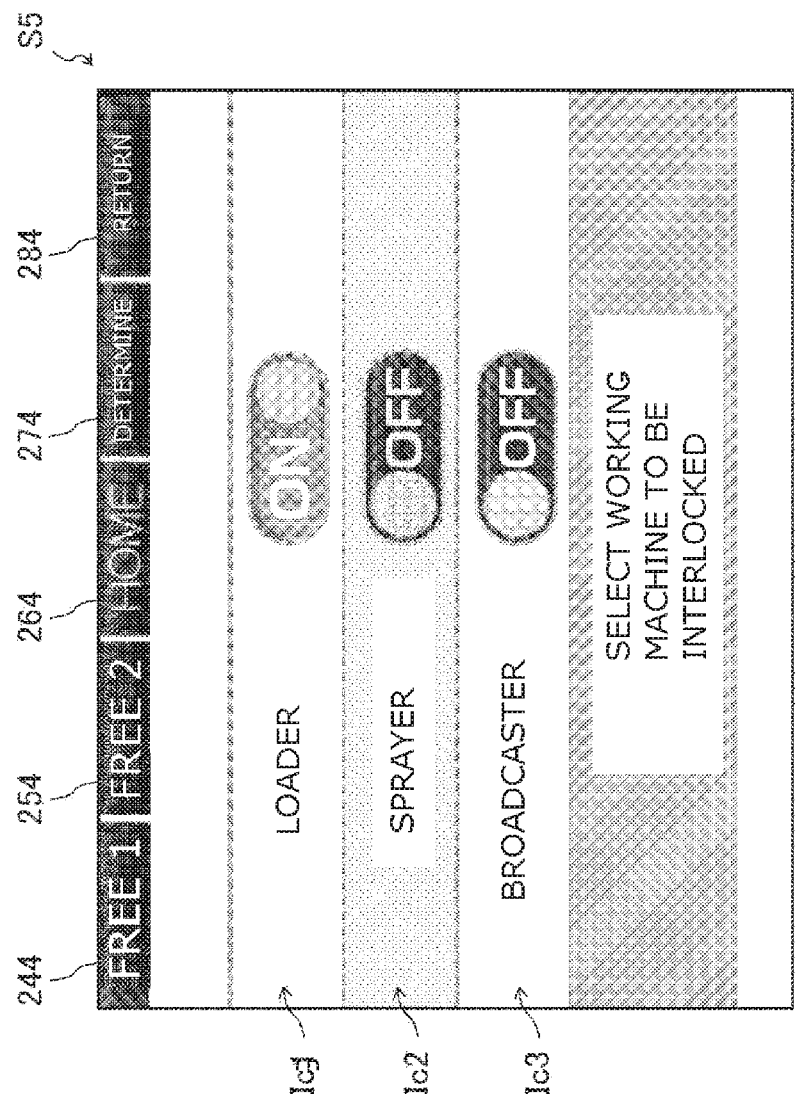
FIG. 16 is a diagram illustrating a screen displayed on the display.

Next, the interlocking working machine screen S5 is displayed on the display 2 (see FIG. 16). The interlocking working machine screen S5 displays three icons Ic1 to Ic3 with the working machine name and ON or OFF. The interlocking working machine screen S5 displays icons 244, 254, 264, 274, and 284, corresponding to the command buttons 24 to 28, at the upper end.

The icons Ic1 to Ic3 are a list of working machines that can be interlocked. The icons Ic1 and Ic3 indicate the working machines that can be interlocked and are attached, and are displayed in a selectable manner. The icon Ic2 indicates a working machine that can be interlocked but is not attached, and is displayed in a non-selectable manner. The icon Ic2 is grayed out meaning that the icon cannot be selected. The icon Ic2 is not selected through the rotation of the encoder dial 22.

Thus, while the interlocking working machine screen S5 is displayed, the operator selects the desired icon Ic1 or Ic3 by rotating the encoder dial 22, and can switch between ON and OFF by pressing the enter button 23. ON indicates that the machine is interlocked and OFF indicates that the machine is not interlocked.

FIG. 16 illustrates a state where the icon Ic2 cannot be selected, and the determination operation can be performed for the icon Ic1 or Ic3. Specifically, when one of the icons Ic1 and Ic3, corresponding to the interlocked working machines, is switched from ON to OFF, the working machine is no longer interlocked. On the other hand, the working machine corresponding to the other one of the icons Ic1 and Ic3 determined by the operation, switched from OFF to ON, is interlocked. Thus, only one working machine is interlocked at a time.

Figure 21:
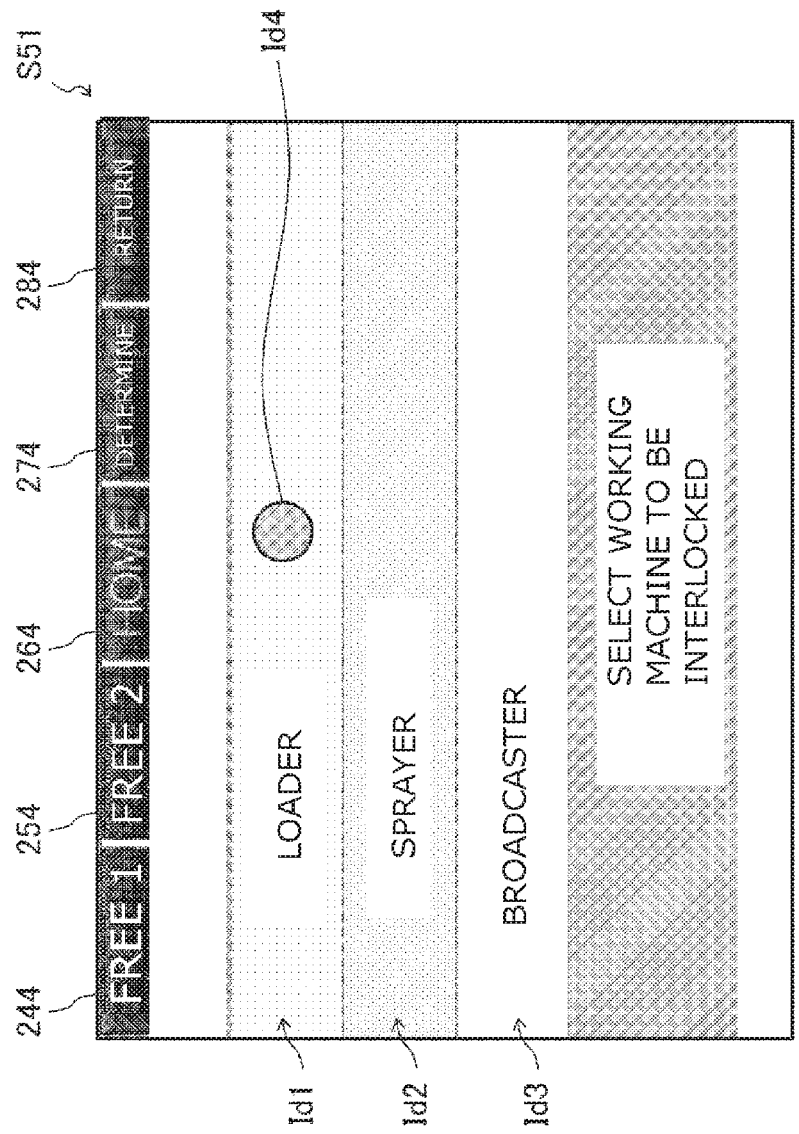
FIG. 21 is a diagram illustrating a screen displayed on the display.

FIG. 21 illustrates another example of the interlocking working machine screen. The icons Id1 to Id3 are a list of working machines that can be interlocked. This interlocking working machine screen S51 uses a highlighted display (icon Id1) for displaying the working machine that can be interlocked and is attached in a selectable manner. In the interlocking working machine screen S51, a green point image Id4 is overlapped on the icon corresponding to the currently interlocked working machine, so that the currently interlocked working machine can be identified. On the interlocking working machine screen S51, the working machine that can be interlocked but is not attached has a corresponding icon (icon Id2) with a gray background indicating that the working machine cannot be selected in an identifiable manner.

Figure 22:
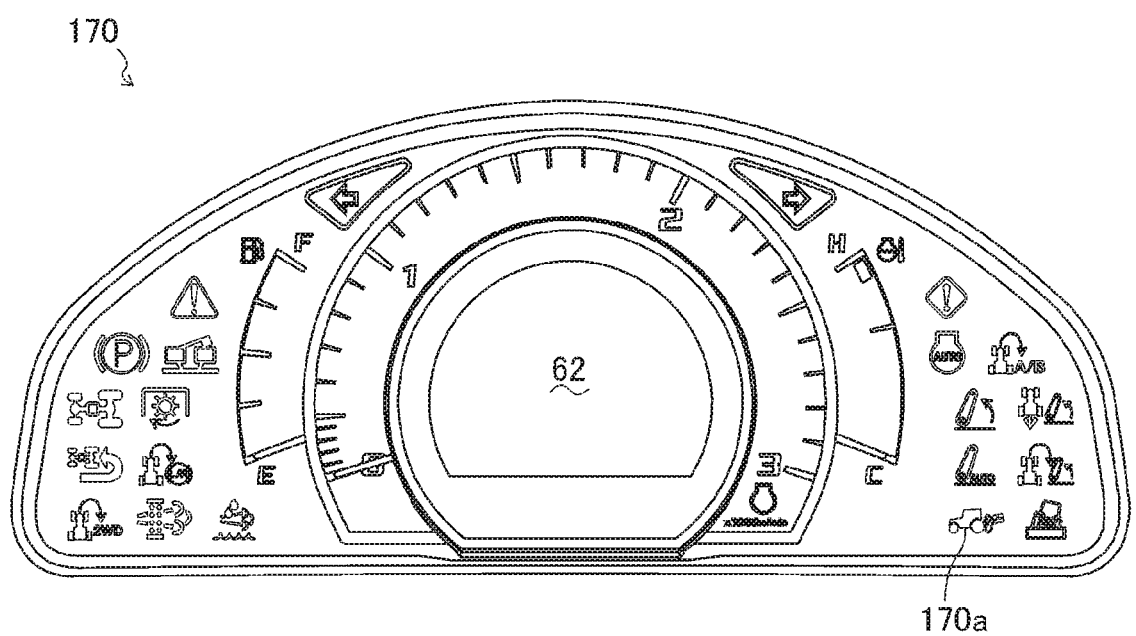
FIG. 22 is a diagram illustrating an instrument panel.

The instrument panel 170 may be provided with an interlocking lamp 170*a* indicating the interlocked state, as illustrated in FIG. 22. The interlocking lamp 170*a* is turned ON when the tractor 1 and the working machine are interlocked, and is turned OFF when they are not interlocked. Thus, the operator can easily recognize whether the working machine is interlocked, simply by looking at the instrument panel 170.

Next, another featured configuration related to the interlocking between the tractor 1 and the working machine is described. In the description below, a case where the interlocked working machine is a sprayer and a case where the interlocked working machine is a broadcaster are separately described.

When the interlocked working machine is a sprayer, the working machine lifting/lowering switch 173 and the working machine lifting/lowering fine-control switches 174 can each be assigned with any one of a sprayer spraying start/stop function, a sprayer spraying amount adjustment function, a sprayer boom extending/contracting function, a boom inclination adjustment function, a boom opening/closing adjustment function, and a boom lifting/lowering adjustment function. The assignment is invalid when the working machine is not interlocked.

A function assigned to each switch can be set by the operator in advance by using the display 2, for example. When the tractor setting (icon Ia3) is selected and determined on the first home screen S3, various tractor setting items are displayed, and sprayer switch assignment setting is called therefrom. Thus, a switch assignment screen S6 as illustrated in FIG. 23 is displayed.

On the switch assignment screen S6, two icons Ie1 and Ie2 on which names of switches that can be assigned are displayed, and icons Ie3 and Ie4 displayed on the right of the icons Ie1 and Ie2 and on which functions assigned to the switches Ie1 and Ie2 are described are displayed. The icons Ie3 and Ie4 are selectively displayed. The switch assignment screen S6 displays the icons 244, 254, 264, 274, and 284, corresponding to the command buttons 24 to 28, at the upper end.

While the switch assignment screen S6 is displayed, the operator selects the desired icon Ie3 or Ie4 by operating the encoder dial 22, and presses the enter button 23. Thus, the display content of the selected icon can be scrolled with the encoder dial 22. Then, the operator selects a desired function by operating the encoder dial 22, and presses the enter button 23. Then, the selected function is assigned to the switch described on the icon displayed on the left side.

Figure 23:
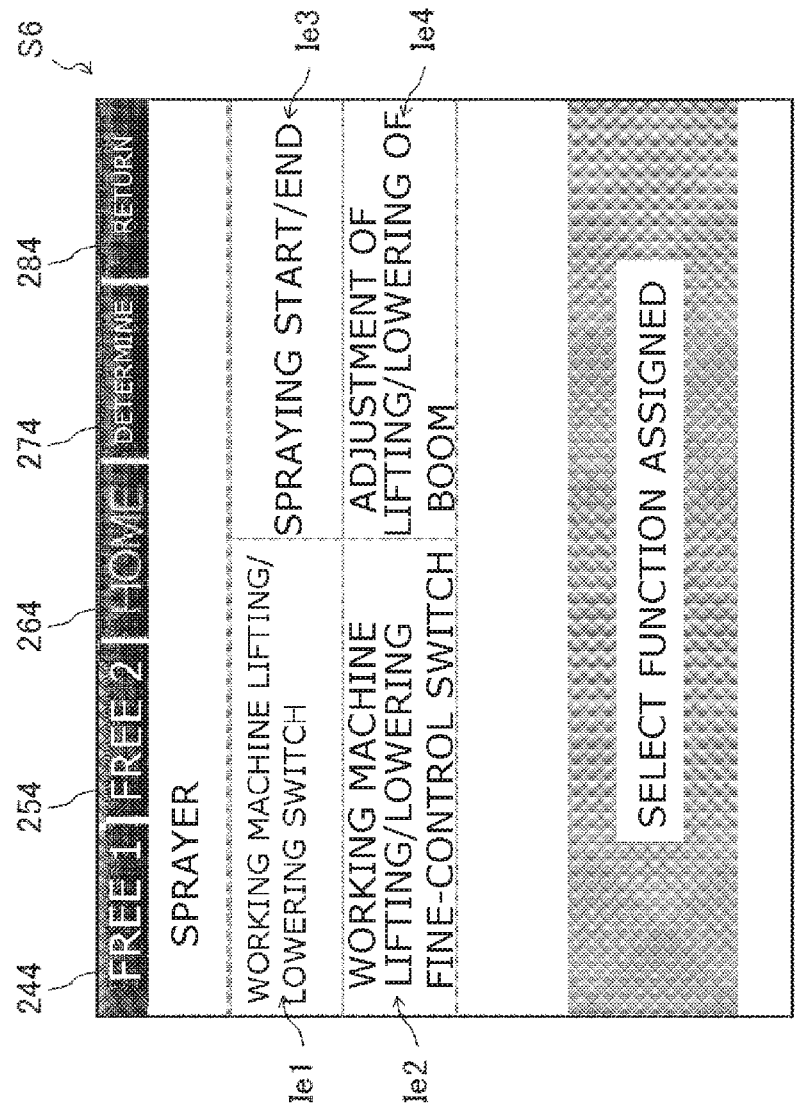
FIG. 23 is a diagram illustrating a screen displayed on the display.

As an example, in FIG. 23, the sprayer spraying start/stop is assigned to the working machine lifting/lowering switch 173. More specifically, the spraying starts when the working machine lifting/lowering switch 173 is slid upward, and stops when the switch is slid downward. The boom lifting/lowering adjustment is assigned to the working machine lifting/lowering fine-control switches 174. More specifically, the boom is lifted when the upper one of the working machine lifting/lowering fine-control switches 174 is pressed, and is lowered when the lower one of the switches is pressed.

As described above, the desired functions for operating the currently interlocked working machine are assigned to the switches (the working machine lifting/lowering switch 173 and the working machine lifting/lowering fine-control switches 174) provided to the transmission lever 172. Thus, the operator can easily operate the assigned functions at hand without releasing his or her hand from the transmission lever 172 for operating the spraying controller 179 or the boom operation controller 180, and thus can enjoy a less cumbersome operation.

When the interlocked working machine is a sprayer, two types of control, including constant vehicle speed control and constant spraying pressure control, can be performed. In the constant vehicle speed control, the vehicle speed is kept constant with the spraying pressure adjusted, when the spraying amount is changed. In the constant spraying pressure control, the spraying is performed with a constant spraying pressure with the vehicle speed adjusted, when the spraying pressure is changed.

Figure 24A:
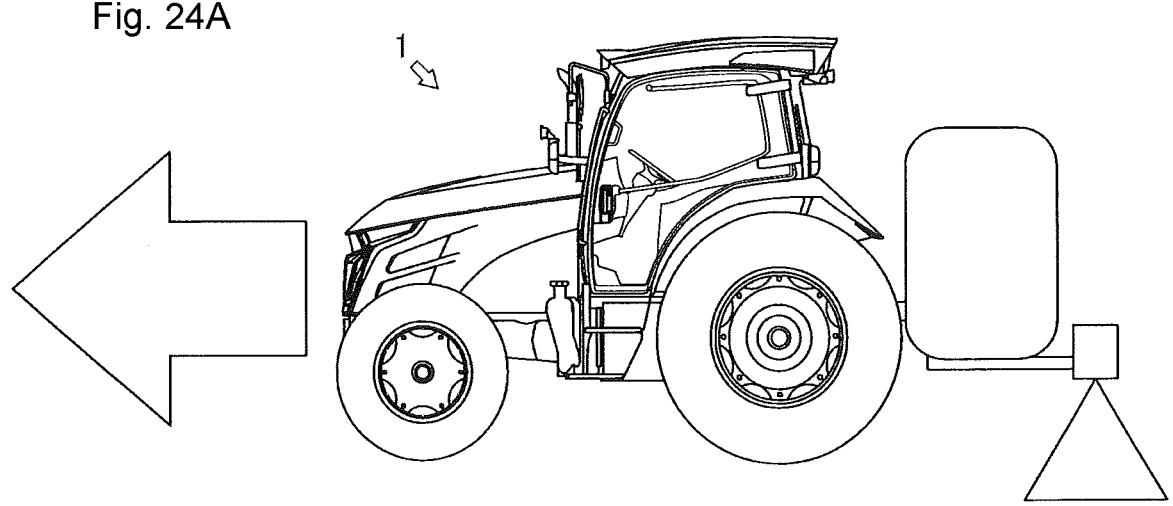
FIGS. 24A and 24B are schematic views illustrating control in a case where a spraying amount of a sprayer is increased, and includes 24A illustrating constant vehicle speed control, and 24B illustrating constant spraying pressure control.
Figure 24B:
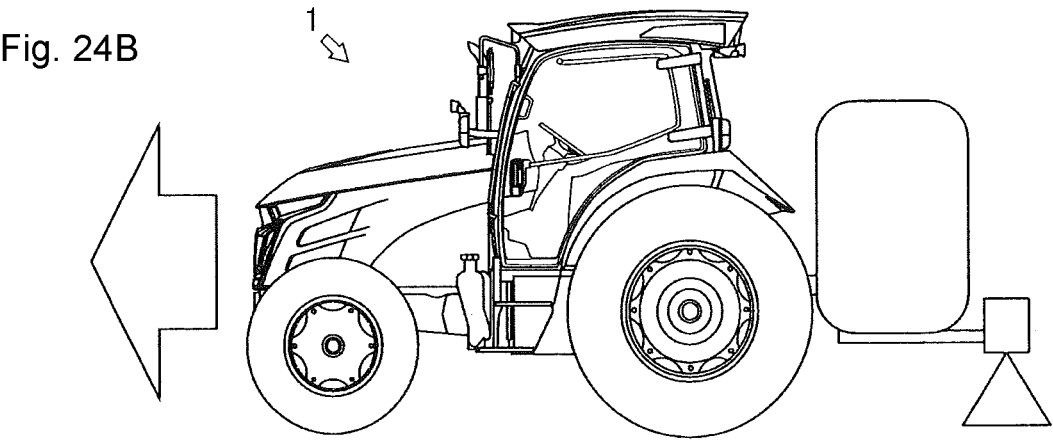

FIGS. 24A and 24B area schematic view illustrating both types of control in a case where the spraying amount is increased, and includes 24A illustrating the constant vehicle speed control, and 24B illustrating the constant spraying pressure control. As illustrated in FIG. 24A, in the constant vehicle speed control, the vehicle speed is automatically maintained to be constant and the spraying pressure automatically rises, when the spraying amount per target acreage is increased. As illustrated in FIG. 24B, in the constant spraying pressure control, the vehicle speed automatically drops and the spraying pressure is automatically maintained to be constant, when the spraying amount per target acreage is increased. The constant spraying pressure control involves no change in the particle size and no change in the spraying state even when the spraying amount is changed, and thus can achieve more accurate work.

Figure 25:
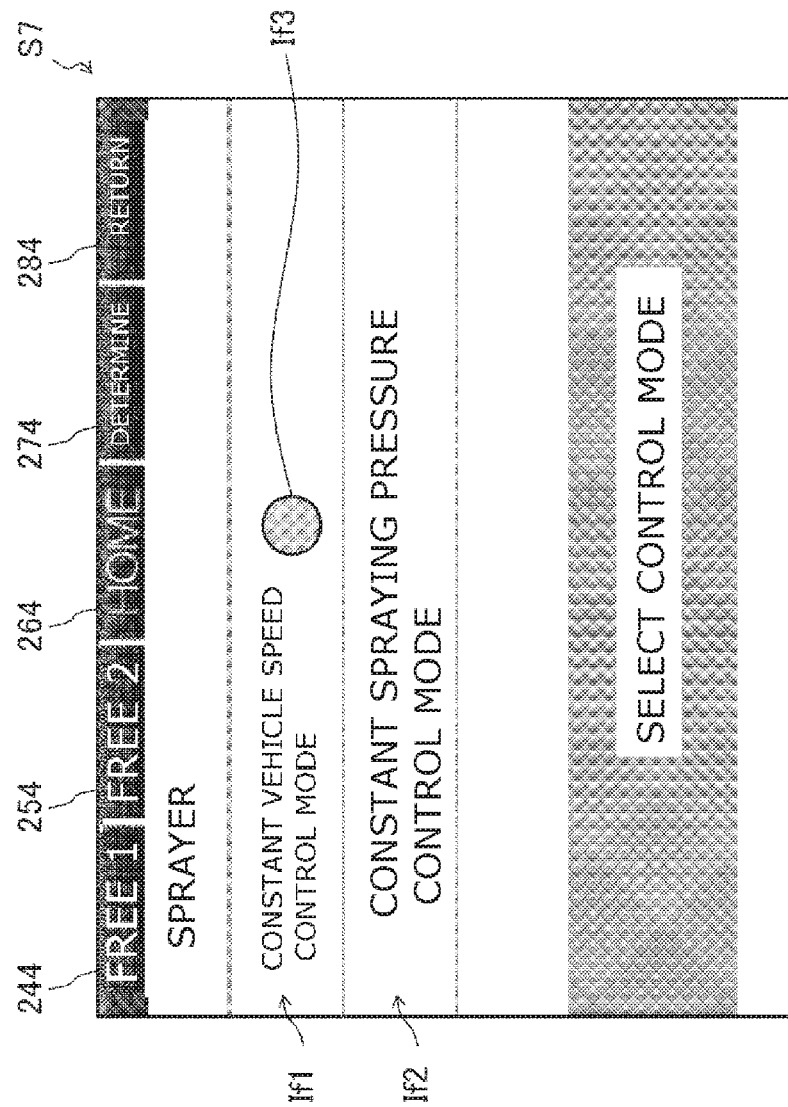
FIG. 25 is a diagram illustrating a screen displayed on the display.

Which one of the two types of control is performed can be set by the operator in advance. The control modes can be set by using the display 2, for example. When the tractor setting (icon Ia3) is selected and determined with the first home screen S3, various setting items for the tractor 1 are displayed. The setting on the sprayer control mode is called therefrom. Thus, a control mode selection screen S7 as illustrated in FIG. 25 is displayed.

The control mode selection screen S7 displays two icons If1 and If2 on which the selectable control modes are described, and a green point image If3 is displayed on the icon of the set control mode in an overlapping manner, so that the set control mode can be identified. The control mode selection screen S7 displays the icons 244, 254, 264, 274, and 284, corresponding to the command buttons 24 to 28, at the upper end.

On the control mode selection screen S7, the operator selects the desired icon If1 or If2 by operating the encoder dial 22, and presses the enter button 23. Thus, the green point image If3 is displayed on the right side of the selected icon, and thus the control mode described on the icon is set. FIG. 25 illustrates a state where the constant vehicle speed control mode is set.

While the tractor 1 before starting the work is stopped, the operator can set the spraying amount, appropriate vehicle speed, and appropriate spraying pressure. The position of the transmission lever 172 (the traveling vehicle speed information) can be checked on the sprayer operation panel 178 while the tractor 1 is stopped, and thus the traveling can be started after the position of the transmission lever 172 is simply adjusted.

When a broadcaster is the currently interlocked working machine, the broadcaster spraying start/stop function or the broadcaster spraying amount adjustment function can be assigned to the working machine lifting/lowering switch 173 and the working machine lifting/lowering fine-control switches 174. The assignment is invalid when the working machine is not interlocked.

A function assigned to each switch can be set by the operator in advance by using the display 2, for example. When the tractor setting (icon Ia3) is selected and determined on the first home screen S3, various tractor setting items are displayed, and broadcaster switch assignment setting is called therefrom. Thus, a switch assignment screen S8 as illustrated in FIG. 26 is displayed.

On the switch assignment screen S8, two icons Ig1 and Ig2 on which names of switches that can be assigned are displayed, and icons Ig3 and Ig4 displayed on the right of the icons Ig1 and Ig2 and on which functions assigned to the switches Ig1 and Ig2 are described are displayed. The icons Ig3 and Ig4 are selectively displayed. The switch assignment screen S8 displays the icons 244, 254, 264, 274, and 284, corresponding to the command buttons 24 to 28, at the upper end.

While the switch assignment screen S8 is displayed, the operator selects the desired icon Ig3 or Ig4 by operating the encoder dial 22, and presses the enter button 23. Thus, the display content of the selected icon can be scrolled with the encoder dial 22. Then, the operator selects a desired function by operating the encoder dial 22, and presses the enter button 23. Then, the selected function is assigned to the switch described on the icon displayed on the left side.

Figure 26:
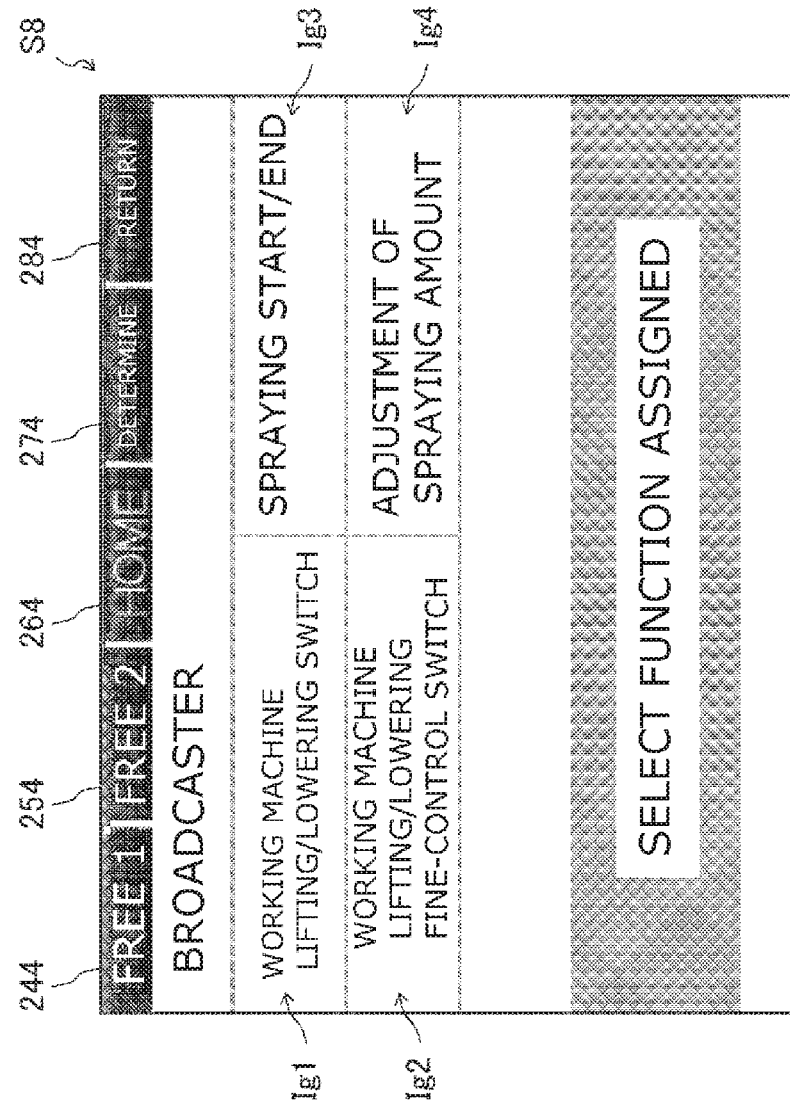
FIG. 26 is a diagram illustrating a screen displayed on the display.

As an example, in FIG. 26, the broadcaster spraying start/stop is assigned to the working machine lifting/lowering switch 173. More specifically, the spraying starts when the working machine lifting/lowering switch 173 is slid upward, and stops when the switch is slid downward. The spraying amount adjustment is assigned to the working machine lifting/lowering fine-control switches 174. More specifically, the spraying amount is increased when the upper one of the working machine lifting/lowering fine-control switches 174 is pressed, and is decreased when the lower one of the switches is pressed.

As described above, the desired functions for operating the currently interlocked working machine are assigned to the switches (the working machine lifting/lowering switch 173 and the working machine lifting/lowering fine-control switches 174) provided to the transmission lever 172. Thus, the operator can easily operate the assigned functions at hand without releasing his or her hand from the transmission lever 172 for operating the broadcaster controller, and thus can enjoy a less cumbersome operation.

INDUSTRIAL APPLICABILITY

The present invention can be used for work vehicles such as a tractor for farm work and a wheel loader for construction work.

REFERENCE SIGNS LIST 1 tractor (work vehicle)
3 control device (control unit)
21 liquid crystal panel (display unit)
22 encoder dial (operation unit)
23 enter button (operation unit)
24 command button (operation unit)
25 command button (operation unit)
26 command button (operation unit)
27 command button (operation unit)
28 command button (operation unit)
172 transmission lever
173 working machine lifting/lowering switch (switch)
174 working machine lifting/lowering fine-control switch (switch)

The invention claimed is:
1. A work vehicle to which a plurality of work vehicle attachments is attachable, the work vehicle comprising:
a display unit configured to:
display, in a selectable manner, a plurality of first work vehicle attachments, wherein:
the plurality of first work vehicle attachments comprises at least three work vehicle attachments,
each of the work vehicle attachments is physically attached to the work vehicle and is able to be interlocked, at least one of the plurality of first work vehicle attachments is physically attached to a first end of the work vehicle, and at least one of the plurality of first work vehicle attachments is physically attached to a second end of the work vehicle; and display, in an identifiable manner, a currently interlocked work vehicle attachment of the plurality of first work vehicle attachments; an operation unit with which an operation of selecting and determining one or more of the plurality of first work vehicle attachments displayed, on the display unit, is performed; and a control unit configured to:

control, when the operation of selecting and determining a desired work vehicle attachment of the plurality of first work vehicle attachments is performed with the operation unit, interlocking of the currently interlocked work vehicle attachment is released and the desired work vehicle attachment determined by the operation is interlocked; and the control unit is configured to control in such a manner that each of the plurality of first work vehicle attachments is detected at a predetermined interval of time.

2. The work vehicle according to claim 1, further comprising:

a transmission lever connected to the control unit; and a switch provided to the transmission lever, wherein the currently interlocked work vehicle attachment comprises a sprayer and the switch is assigned with any one of a spraying start/end function for the sprayer, a spraying amount adjustment function for the sprayer, an extending/contracting adjustment function for a boom of the sprayer, an inclination adjustment function for the boom, an opening/closing adjustment function for the boom, and a lifting/lowering adjustment function for the boom.

3. The work vehicle according to claim 1, wherein:

the display unit is further configured to display one or more second work vehicle attachments, each of which is not attached and is able to be interlocked, in an identifiable and non-selectable manner; and the one or more of the plurality of first work vehicle attachments displayed on the display unit includes the currently interlocked work vehicle attachment and the desired work vehicle attachment of the plurality of first work vehicle attachments.

4. The work vehicle according to claim 3, further comprising:

one or more user-input devices coupled to the operation unit and configured to enable selecting the desired work vehicle attachment; and wherein the display unit is configured to concurrently display the plurality of first work vehicle attachments and the one or more second work vehicle attachments.

5. The work vehicle according to claim 4, wherein the one or more user-input devices comprise a plurality of buttons and an encoder dial.

6. The work vehicle according to claim 4, wherein the one or more user-input devices comprises a switch and a transmission level coupled to the control unit.

7. The work vehicle according to claim 4, wherein a first work vehicle attachment of the plurality of first work vehicle attachments comprises a sprayer.

8. The work vehicle according to claim 7, wherein a second work vehicle attachment of the plurality of first work vehicle attachments comprises a broadcaster.

9. The work vehicle according to claim 8, wherein:

based on the first work vehicle attachment being interlocked, the one or more user-input devices is configured to enable at least one function selected from the group consisting of:

a spraying start/end function for the sprayer;

a spraying amount adjustment function for the sprayer;

an extending/contracting adjustment function for a boom of the sprayer;

an inclination adjustment function for the boom;

an opening/closing adjustment function for the boom; and a lifting/lowering adjustment function for the boom; and based on the second work vehicle attachment being interlocked, the one or more user-input devices is configured to enable:

a spraying start/end function for the broadcaster; or a spraying amount adjustment function for the broadcaster.

10. The work vehicle of claim 1, wherein the display unit is further configured to:

concurrently display:

an indication that a non-interlocked work vehicle attachment of the plurality of first work vehicle attachments is not interlocked, and an indication the currently interlocked work vehicle attachment of the plurality of first work vehicle attachments is interlocked.

11. The work vehicle of claim 10, wherein:

the display unit is further configured to concurrently display:

in a non-selectable manner, one or more indications corresponding to a plurality of second work vehicle attachments, each of which is capable of attachment to the work vehicle, but not currently attached, and an indication that the plurality of first work vehicle attachments are attached.

12. A work vehicle to which a plurality of work vehicle attachments is attachable, the work vehicle comprising:

a display configured to:

display one or more indications of a plurality of first work vehicle attachments, each of which is physically attached to the work vehicle and is able to be interlocked with the work vehicle, the plurality of first work vehicle attachments comprising:

a first work vehicle attachment interlocked with the work vehicle and physically attached to a first end of the work vehicle;

a second work vehicle attachment that is not interlocked with the work vehicle and is physically attached to a second end of the work vehicle; and a third work vehicle attachment that is not interlocked with the work vehicle and is physically attached to the second end of the work vehicle; and a controller coupled to the display and configured to:

in response to a selection of at least one of the first and second work vehicle attachments:

initiate an interlock release operation associated with the first work vehicle attachment such that the first work vehicle attachment is not interlocked with the work vehicle; and initiate an interlock operation associated with the second work vehicle attachment; and transmit a signal at a periodic interval to detect each work vehicle attachment attached to the work vehicle.

13. The work vehicle according to claim 12, further comprising:

one or more user-input devices coupled to the controller and configured to enable the selection; and wherein:

the display is configured to display one or more indications of a fourth work vehicle attachment that is not physically attached to the work vehicle and that is interlockable with the work vehicle; and the one or more user-input devices comprise a plurality of buttons and an encoder dial.

14. The work vehicle according to claim 12, wherein:

the first end corresponds to a front of the work vehicle, and the second end corresponds to a rear of the work vehicle.

15. The work vehicle according to claim 14, wherein:

only a single work vehicle attachment of the plurality of first work vehicle attachments is interlocked to the work vehicle at a time; and the controller is configured to change an operation parameter of the work vehicle when interlocking one of the plurality of first work vehicle attachments.

16. The work vehicle according to claim 12, wherein:

the first work vehicle attachment comprises a loader;

the second work vehicle attachment comprises a sprayer; and the third work vehicle attachment comprises a broadcaster.

17. The work vehicle according to claim 16, wherein the controller is configured to change a hydraulic operation of the work vehicle based on the interlock release operation of the second work vehicle attachment and the interlock operation of the third work vehicle attachment.

\* \* \* \* \*